US009061323B2

(12) United States Patent
Field et al.

(10) Patent No.: US 9,061,323 B2
(45) Date of Patent: *Jun. 23, 2015

(54) APPARATUS AND METHOD FOR GENERATING OXIDATIVELY AND THERMALLY-ENHANCED TREATMENT LIQUIDS

(71) Applicant: Tennant Company, Minneapolis, MN (US)

(72) Inventors: Bruce F. Field, Golden Valley, MN (US); Russell J. Pylkki, St. Paul, MN (US); Mark Steven Citsay, Lake Elmo, MN (US); Charles W. O'Neil, Edina, MN (US)

(73) Assignee: Tennant Company, Minneapolis, MN (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/912,881

(22) Filed: Jun. 7, 2013

(65) Prior Publication Data
US 2013/0327353 A1    Dec. 12, 2013

Related U.S. Application Data

(60) Provisional application No. 61/657,330, filed on Jun. 8, 2012.

(51) Int. Cl.
*B08B 6/00* (2006.01)
*B08B 7/00* (2006.01)
(Continued)

(52) U.S. Cl.
CPC . *B08B 7/00* (2013.01); *A47L 11/30* (2013.01); *C25B 15/02* (2013.01); *B08B 3/10* (2013.01);
(Continued)

(58) Field of Classification Search
CPC .......... A47L 11/30; C25B 15/02; B08B 3/10; B08B 3/00; B08B 3/02; B08B 7/0035; B08B 7/0057
USPC .......................... 134/1, 10, 42; 205/742, 746
See application file for complete search history.

(56) References Cited

U.S. PATENT DOCUMENTS 6,705,332 B2    3/2004   Field et al.
6,761,127 B2    7/2004   Field et al.
(Continued)

FOREIGN PATENT DOCUMENTS

WO       2013112807       8/2013
WO       WO2013/112807   *  8/2013

OTHER PUBLICATIONS

Bolton, James R., "Ultraviolet Applications Handbook, Third Edition", ICC Lifelong Learn Inc., 2010, 60 pages.
(Continued)

*Primary Examiner* — Bibi Carrillo
(74) *Attorney, Agent, or Firm* — David D. Brush; Westman, Champlin & Koehler, P.A.

(57) ABSTRACT

A cleaning system comprising a liquid source configured to provide a feed liquid at a first temperature, and an electrolysis cell configured to receive the feed liquid and to electrochemically activate the feed liquid to provide an electrochemically-activated liquid, wherein the electrochemical activation also heats the feed liquid such that the electrochemically-activated liquid is at an elevated temperature that is greater than the first temperature. The cleaning system also includes a dispenser configured to dispense the electrochemically-activated liquid.

11 Claims, 16 Drawing Sheets

(51) Int. Cl.

| | | |
|---|---|---|
| *A47L 11/40* | (2006.01) | |
| *C02F 1/461* | (2006.01) | |
| *C02F 9/00* | (2006.01) | |
| A47L 11/30 | (2006.01) | |
| C25B 15/02 | (2006.01) | |
| B08B 3/10 | (2006.01) | |
| B08B 3/00 | (2006.01) | |
| B08B 3/02 | (2006.01) | |
| C02F 1/32 | (2006.01) | |
| B08B 1/04 | (2006.01) | |
| C02F 1/467 | (2006.01) | |

(52) U.S. Cl.
CPC .... *B08B 3/00* (2013.01); *B08B 3/02* (2013.01); *B08B 7/0035* (2013.01); *B08B 7/0064* (2013.01); *A47L 11/4083* (2013.01); *C02F 1/32* (2013.01); *C02F 2201/46155* (2013.01); *B08B 1/04* (2013.01); *B08B 3/024* (2013.01); *C02F 1/46104* (2013.01); *C02F 1/4618* (2013.01); *C02F 1/4674* (2013.01); *C02F 9/00* (2013.01); *C02F 2001/46133* (2013.01); *C02F 2201/46115* (2013.01); *C02F 2201/4613* (2013.01); *B08B 7/0057* (2013.01)

(56) References Cited

U.S. PATENT DOCUMENTS

| | | | |
|---|---|---|---|
| 7,051,399 | B2 | 5/2006 | Field et al. |
| 7,442,288 | B2 * | 10/2008 | Sumita .................. 205/746 |
| 2005/0022844 | A1 | 2/2005 | Field et al. |
| 2007/0186367 | A1 | 8/2007 | Field et al. |
| 2007/0186368 | A1 | 8/2007 | Field et al. |
| 2007/0186954 | A1 | 8/2007 | Field et al. |
| 2007/0187263 | A1 | 8/2007 | Field et al. |
| 2009/0032409 | A1 * | 2/2009 | Horn et al. .................. 205/688 |
| 2009/0120460 | A1 * | 5/2009 | Hekman et al. ................. 134/6 |
| 2009/0301521 | A1 | 12/2009 | Field |
| 2009/0311137 | A1 | 12/2009 | Field |
| 2009/0314651 | A1 | 12/2009 | Field |
| 2009/0314658 | A1 | 12/2009 | Field |
| 2009/0314659 | A1 | 12/2009 | Field |
| 2010/0147700 | A1 | 6/2010 | Field et al. |
| 2010/0147701 | A1 | 6/2010 | Field |
| 2011/0219555 | A1 | 9/2011 | Field et al. |
| 2012/0067738 | A1 | 3/2012 | Field |
| 2012/0097201 | A1 | 4/2012 | Field |
| 2013/0193001 | A1 | 8/2013 | Field et al. |

OTHER PUBLICATIONS

Buettner, Garry R. et al., "Spin-Trapping Methods for Detecting Superoxide and Hydroxyl Free Radicals In Vitro an In Vivo", Critical Reviews of Oxidative Stress and Aging: Advances in Basic Science, Diagnostics and Intervention, 2003, 11 pages.

Buettner, Garry R., "What Are Free Radicals?", Sunrise Free Radical School Free Radical Biology: Back to the Basics, Nov. 2009, 31 pages.

Fang, Yangang et al., "Photolysis of aqueous free chlorine species (HOCl and OCl-) with 254 nm ultraviolet light", J. Environ. Eng. Sci. vol. 6, 2007, pp. 277-284.

Henton, H.J.H., "Oxidation of Tartaric Acid in Presence of Iron", J. Chem. Soc., 1894, p. 899.

Hunt, John P., "The Photochemical Decomposition of Hydrogen Peroxide. Quantum Yields, Tracer and Fractionation Effects", Dec. 1952, 4 pages.

Jin, Jing et al., "Assessment of the UV/Chlorine process as an advanced oxidation process", www.sciencedirect.com, 2011, pp. 1890-1896.

Joiner, Andrew, "The bleaching of teeth: A review of the literature", www.sciencedirect.com, 2006, pp. 412-419.

Kashima-Tanaka, Midori et al., "Generation of Free Radicals and/or Active Oxygen by Light or Laser Irradiation of Hydrogen Peroxide or Sodium Hypochlorite", Journal of Endodontics, vol. 29, No. 2, Feb. 2003, 3 pages.

Qiang, Zhimin et al., "Electrochemical generation of hydrogen peroxide from dissolved oxygen in acidic solutions", Water Research, 2002, pp. 85-94.

Sichel, C., "Feasibility studies: UV/chlorine advanced oxidation treatment for the removal of emerging contaminants", www.sciencedirect.com, 2011, pp. 6371-6380.

"Sodium Hypochlorite", Brochure, The Soap and Detergent Association, 1997, 10 pages.

Stan, Silvia D. et al., "5,5-Dimethyl-2-pyrrolidone-N-oxyl Formation in Electron Spin Resonance Studies of Electrolyzed NaCl Solution Using 5,5-Dimethyl-1-pyrroline-N-oxide as a Spin Trapping Agent", Journal of Agricultural and Food Chemistry, 2005, pp. 4906-4910.

Stan, Silvia D. et al., "Investigation of the Presence of OH Radicals in Electrolyzed NaCl Solution by Electron Spin Resonance Spectroscopy", Journal of Agricultural and Food Chemistry, 2005, pp. 4901-4905.

Strassler, Howard E., "Vital Tooth Bleaching: An Update", The Baltimore College of Dental Surgery, University of Maryland Dental School, 2006, 12 pages.

Truman, James, "Discolored and Necrosed Teeth", The Dental Times, A Quarterly Journal of Dental Science, Pennsylvania College of Dental Surgery, Sep. 1864, 6 pages.

Urey, H.C., "The Absorption Spectrum and Decomposition of Hydrogen Peroxide by Light", May 6, 1929, 13 pages.

http://www.h2o2.com/technical-library/physical-chemical-properties/radiation-properties/default.aspx?pid=65&name=Ultraviolet-Absorption-Spectrum, "Ultraviolet Absorption Spectrum", Datasheet, available prior to Oct. 30, 2013, 1 page.

Ritter, J.W., "UV experiments", Annalen der Physik 12, 1803, 7 pages.

Invitation to Pay Additional Fees and, Where Applicable, Protest Fee dated Oct. 11, 2013 from International Application No. PCT/US2013/044648.

International Search Report and English Translation of the Written Opinion dated Feb. 18, 2014 for corresponding International Patent Application No. PCT/US2013/044848, filed Jun. 7, 2013.

* cited by examiner

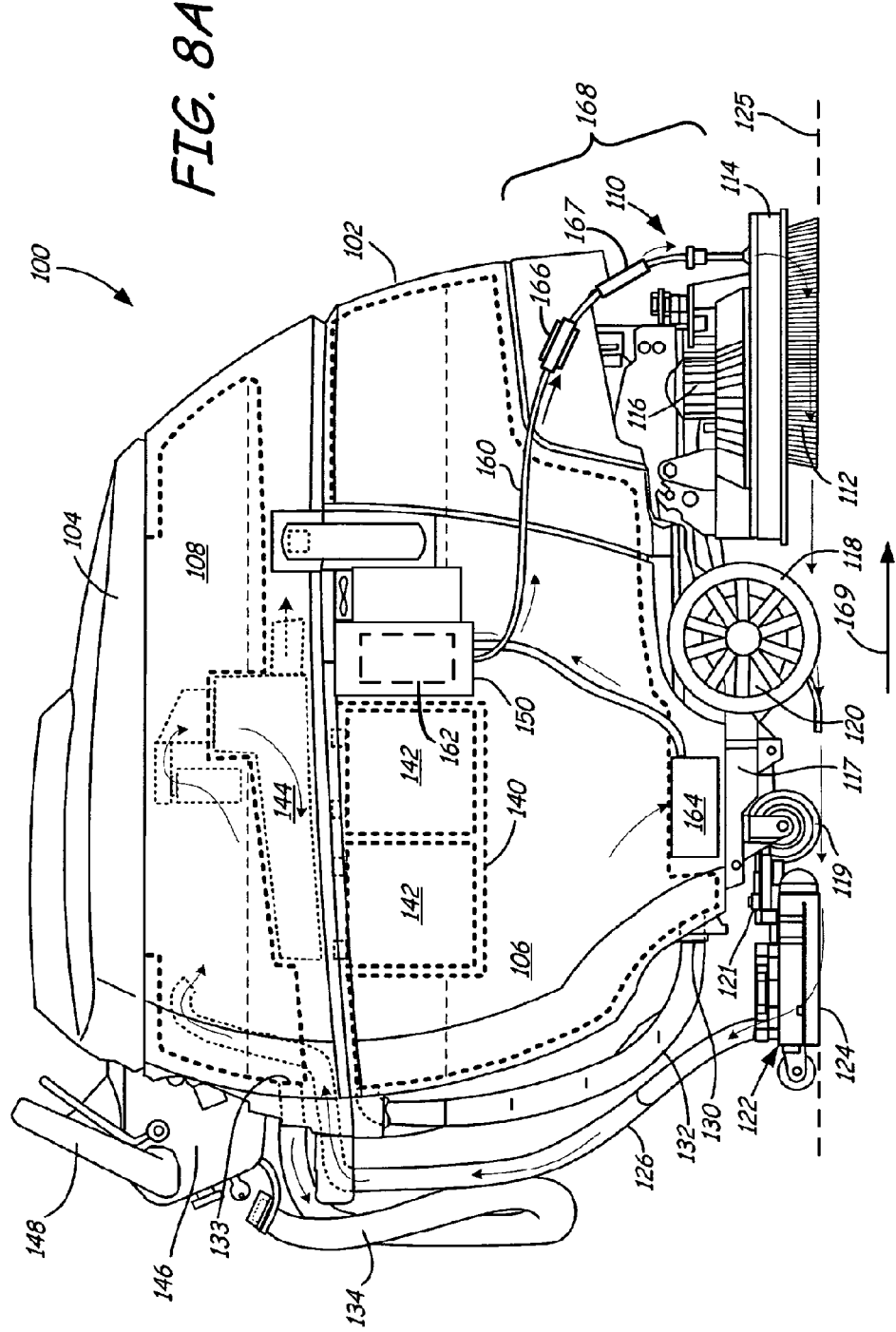

APPARATUS AND METHOD FOR GENERATING OXIDATIVELY AND THERMALLY-ENHANCED TREATMENT LIQUIDS

CROSS-REFERENCE TO RELATED APPLICATION(S)

The present application claims priority to U.S. Provisional Application No. 61/657,330, entitled "APPARATUS AND METHOD FOR GENERATING OXIDATIVELY AND THERMALLY-ENHANCED TREATMENT LIQUIDS", filed on Jun. 8, 2012.

FIELD

The present disclosure relates to cleaning and/or sanitizing systems, and more particularly to systems and methods that generate oxidatively and thermally-enhanced liquids having cleaning and/or sanitizing properties.

BACKGROUND

A wide variety of systems are in use today for cleaning or disinfecting residential, industrial, commercial, hospital, food processing, and restaurant facilities, such as surfaces and other substrates, and for cleaning or disinfecting various items, such as food products or other articles.

For example, hard floor surface scrubbing machines are widely used to clean the floors of industrial and commercial buildings. They range in size from a small model, which is controlled by an operator walking behind it, to a large model, which is controlled by an operator riding on the machine. Such machines in general are wheeled vehicles with suitable operator controls. Their bodies contain power and drive elements, a solution tank to hold a cleaning liquid, and a recovery tank to hold soiled solution recovered from the floor being scrubbed. A scrub head, which contains one or more scrubbing brushes and associated drive elements are attached to the vehicle and may be located in front of, under or behind it. A solution distribution system dispenses cleaning liquid from the solution tank to the floor in the vicinity of the scrubbing brush or brushes.

Soft floor cleaning machines can be implemented as small mobile machines that are handled by an operator or can be implemented in a truck-mounted system having a cleaning wand connected to the truck. The truck carries a cleaning liquid solution tank, a wastewater recovery tank and a powerful vacuum extractor.

Typical cleaning liquids used in hard and soft floor cleaning systems include water and a chemically based detergent. The detergent typically includes a solvent, a builder, and a surfactant. While these detergents increase cleaning effectiveness for a variety of different soil types, such as dirt and oils, these detergents also have a tendency to leave unwanted residue on the cleaned surface. Such residue can adversely affect the appearance of the surface and the tendency of the surface to re-soil and, depending on the detergent, can potentially cause adverse health or environment effects. Similar disadvantages apply to cleaning systems for other types of surfaces and items. Improved cleaning systems are desired for reducing the use of typical detergents and/or reducing the residue left on the surface after cleaning while maintaining desired cleaning and/or disinfecting properties, for example.

SUMMARY

An aspect of the present disclosure is directed to a cleaning system that includes a liquid source configured to provide a feed liquid at a first temperature, and an electrolysis cell. The electrolysis cell is configured to receive the feed liquid and to electrochemically activate the feed liquid to provide an electrochemically-activated liquid, where the electrochemical activation also heats the feed liquid such that the electrochemically-activated liquid is at an elevated temperature that is greater than the first temperature. The cleaning system also includes a dispenser configured to dispense the electrochemically-activated liquid.

Another aspect of the present disclosure is directed to a method for cleaning a surface. The method includes pumping a feed liquid having a first temperature from a liquid source to an electrolysis cell, and electrochemically activating and heating the feed liquid in the electrolysis cell to provide an electrochemically-activated liquid at an elevated temperature that is greater than the first temperature. The method also includes dispensing the electrochemically-activated liquid to the surface.

Another aspect of the present disclosure is directed to a method for cleaning a surface, which includes pumping a feed liquid from a liquid source to an electrolysis cell, and inducing a current through the electrolysis cell to electrochemically activate and heat the feed liquid in the electrolysis cell to provide an electrochemically-activated liquid. The method also includes directing at least a portion of the electrochemically-activated liquid through a fluid line, and monitoring a temperature of the electrochemically-activated liquid in the fluid line. The method further includes controlling at least one of the pumping and the inducing of the current in response to the monitored temperature, and dispensing the at least one portion of the electrochemically-activated liquid to the surface.

BRIEF DESCRIPTION OF THE DRAWINGS

FIG. 8A is a side elevation view of a mobile hard floor surface cleaner in accordance with one or more exemplary embodiments of the disclosure.

DETAILED DESCRIPTION

The present disclosure is directed to a system and method for generating a thermally-enhanced and oxidatively-enhanced treatment liquid for cleaning surfaces. As discussed below, the system may incorporate an electrolysis cell that electrochemically activates a feed liquid (e.g., water) to generate an alkaline or basic catholyte liquid, an acidic anolyte liquid, or a blended combination of the alkaline and acidic species. In one embodiment, the electrolysis cell is configured to heat the feed liquid during electrolysis to increase the cleaning properties of the liquid, where the electrolysis cell may be controlled to maintain a desired temperature and electrochemical properties for the output electrochemically-activated liquid.

In some embodiments, the system may also include one or more heating elements to heat the liquid. For example, the heating element(s) may heat the liquid in coordination with an electrolysis cell to attain a desired temperature for the output electrochemically-activated liquid.

Additionally, the electrochemically-activated liquid generated from an electrolysis cell exhibits reactive oxidative species (e.g., hydrogen peroxide and hydrogen hypochlorite). The oxidative power of these species can be enhanced by the application of an appropriate wavelength of electromagnetic radiation, such as UV-radiation. As such, in further embodiments, the system may also include one or more UV-radiation generators to further increase the oxidation potential of an electrochemically-activated liquid from an electrolysis cell. For example, the UV-radiation generator(s) may increase the oxidative potentials of reactive oxidative species in the electrochemically-activated liquid (e.g., hydrogen peroxide and hydrogen hypochlorite). The resulting oxidatively-enhanced liquid may also be heated with the heating element(s) to attain a desired temperature for the treatment liquid.

Figure 1:
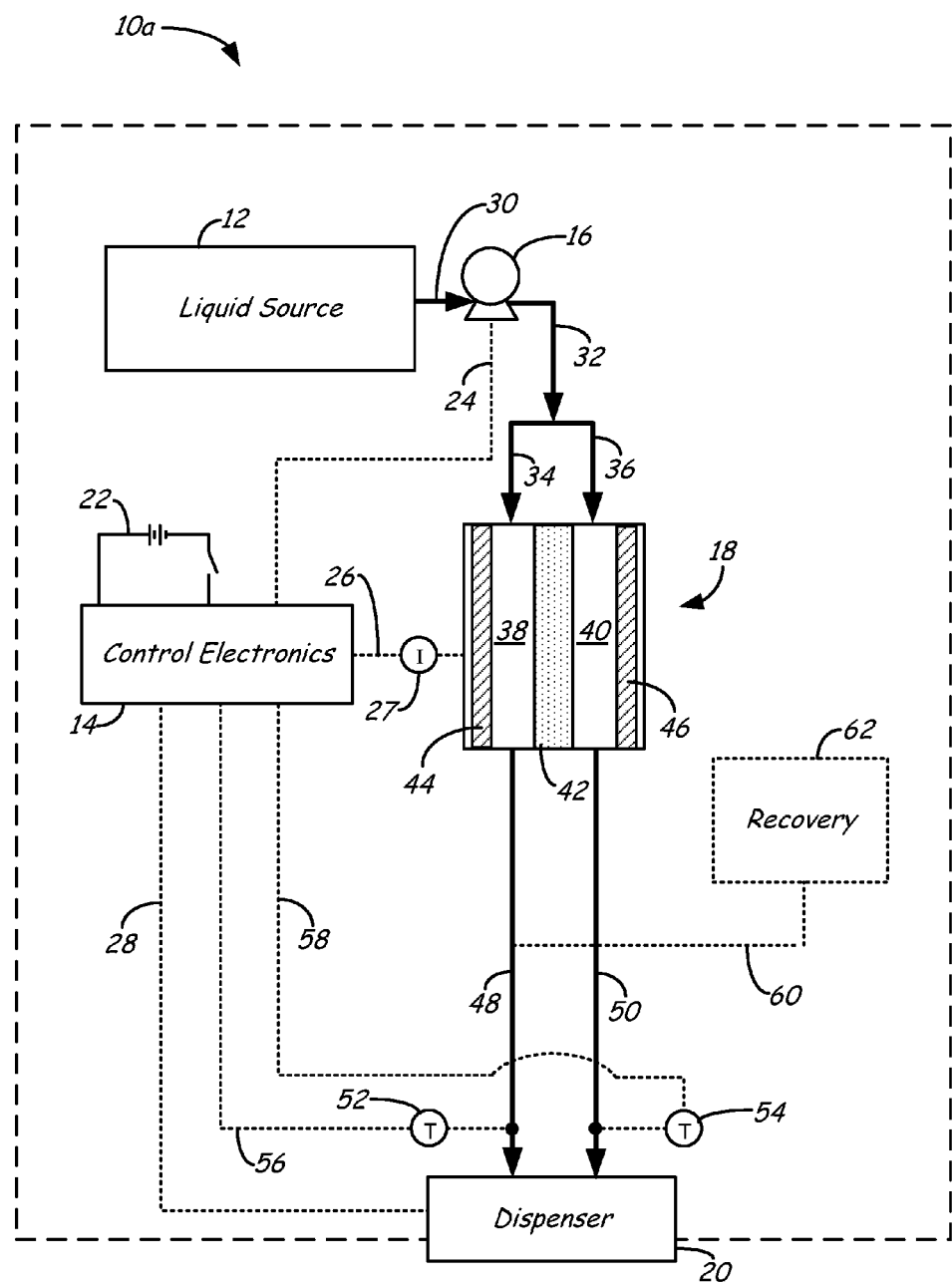
FIG. 1 is a schematic illustration of a cleaning system of the present disclosure, which includes an electrolysis cell for electrochemically activating and heating a feed liquid.

FIG. 1 is a simplified, schematic diagram of cleaning system 10a, which is an example of a suitable cleaning system of the present disclosure to generate thermally-enhanced treatment liquids for cleaning surfaces. As shown, system 10a includes liquid source 12, control electronics 14, pump 16, electrolysis cell 18, and dispenser 20.

Liquid source 12 is a reservoir or fluid line coupling for containing and/or receiving a feed liquid to be treated and then dispensed by cleaning system 10a. In some embodiments, the feed liquid may include one or more additives, such as electrolytic compositions (e.g. salts), which are desirably dissolved or otherwise suspended in the feed liquid. In other embodiments, the feed liquid may consist essentially of tap water. The following discussion of the cleaning systems of the present disclosure (e.g., cleaning system 10a) is made with reference to water (e.g., tap water) as the feed liquid with the understanding that the cleaning systems of the present disclosure may be used with a variety of different feed liquids.

Control electronics 14 includes a printed circuit board containing electronic devices for powering and controlling the operation of pump 16, electrolysis cell 18, dispenser 20, and optionally, other suitable components of cleaning system 10a (e.g., an electric motor). For example, control electronics 14 may apply electrical power from electrical source 22 to pump 16, electrolysis cell 18, and dispenser 20, respectively over electrical lines 24, 26, and 28 during operation.

In one embodiment, control electronics 14 simultaneously applies electrical power to pump 16, electrolysis cell 18, and dispenser 20. This embodiment is beneficial for providing an on-demand activation of pump 16, electrolysis cell 18, and dispenser 20, such as when a user of cleaning system 10a actuates a lever or other control mechanism (not shown). Alternatively, control electronics 14 may independently and automatically apply electrical power to pump 16, electrolysis cell 18, and/or dispenser 20, such as upon forward movement of a mobile floor surface cleaner in which the system 10 may be installed. In some embodiments, dispenser 20 may be a passive dispenser that is not directly operated by control electronics 14, for example.

Pump 16 is a liquid pump operated by control electronics 14 to draw the feed water from liquid source 12 through fluid line 30 at a predetermined flow rate. The predetermined flow rate may be based on a fixed pumping rate, or may be adjustable by control electronics 12 over electrical line 24, thereby allowing the flow rate of the feed water to be adjusted.

In the shown embodiment, pump 16 is located downstream from liquid source 12 and upstream from electrolysis cell 18 for drawing water from liquid source 12 to electrolysis cell 18. In alternative embodiments, pump 16 may be positioned at any suitable location between liquid source 12 and dispenser 20.

Electrolysis cell 18 receives the pumped feed water from pump 16 over fluid line 32, which splits into inlet lines 34 and 36 prior to (or after) entering electrolysis cell 18. In particular, a first portion of the feed water may flow through inlet line 34, and is directed into anode chamber 38 of electrolysis cell 18. Correspondingly, a second portion of the feed water in inlet line 36 is directed into anode chamber 40 of electrolysis cell 18. While illustrated as a single cell, cleaning system 10a may alternatively include multiple electrolysis cells 18 arranged serially and/or in parallel.

Electrolysis cell 18 also includes barrier 42, anode electrode 44, and cathode electrode 46, where barrier 42 includes a membrane or other diaphragm that separates anode chamber 38 and cathode chamber 40. Anode electrode 44 includes one or more electrodes located in anode chamber 38. Correspondingly, cathode electrode 46 includes one or more electrodes located in cathode chamber 40.

Barrier 42 has pores in a range of about 1 micron to about 200 microns, for example. With small pores sizes, the barrier can act as a selective ion exchange membrane. In embodiments in which barrier 42 is a membrane, barrier 42 can include a cation exchange membrane (i.e., a proton exchange membrane) or an anion exchange membrane. Suitable cation exchange membranes for barrier 42 include partially and fully fluorinated ionomers, polyaromatic ionomers, and combinations thereof. Examples of suitable commercially available ionomers for barrier 42 include sulfonated tetrafluoroethylene copolymers available under the trademark "NAFION" from E.I. du Pont de Nemours and Company, Wilmington, Del.; perfluorinated carboxylic acid ionomers available under the trademark "FLEMION" from Asahi Glass Co., Ltd., Japan; perfluorinated sulfonic acid ionomers available under the trademark "ACIPLEX" Aciplex from Asahi Chemical Industries Co. Ltd., Japan; and combinations thereof.

In another embodiment, barrier 42 includes a material that does not act as a selective ion exchange membrane, but maintains general separation of the anode and cathode compartments. In one particular example, the barrier material includes pores having diameters of about 100-110 microns, whereas typical pore sizes of a selective ion exchange membrane may be about 1 micron in diameter, for example. These large pores conduct current between the anode and cathode electrodes and facilitate production of bubbles in the output liquid. Exemplary materials for such a barrier include polypropylene, polyester, nylon, PEEK mesh, Polytetrafluoroethylene (PTFE), and thermoplastic mesh, for example. In a particular example, the barrier material includes polypropylene having a thickness of 10 mils (0.254 mm). Other materials and material thicknesses can also be used. Electrodes 44 and 46 can be made from any suitable material, such as stainless steel, titanium and/or titanium coated with a precious metal, such as platinum, or any other suitable electrode material. The electrodes and respective chambers can have any suitable shape and construction. For example, electrodes 44 and 46 can be flat plates, coaxial plates, rods, or a combination thereof, and may be solid or mesh (i.e., porous). In one specific example, electrodes 44 and 46 are coaxial mesh plates formed of 0.023-inch diameter T316 (or, e.g. 304) stainless steel having a grid pattern of 20×20 grid openings per square inch. In other embodiments the electrodes include titanium with an iridium oxide, platinum or white gold coating, for example. In one specific example, the electrodes are spaced apart from one another by a gap of about 15-50 thousandths of an inch (0.015 inch to 0.050 inch; or 0.38 mm to 1.27 mm), such as 0.030 inches (0.76 mm). Alternatively, one or both electrodes may be solid. Other dimensions, arrangements and materials can be used in other examples.

Electrodes 44 and 46 are electrically connected to opposite terminals of a power supply, such as electrical source 22, through control electronics 14 and electrical line 26. During operation, control electronics 14 may apply a voltage potential across anode electrode 44 and cathode electrode 46. Control electronics 14 can provide a constant DC output voltage, a pulsed or otherwise modulated DC output voltage, and/or a pulsed or otherwise modulated AC output voltage to electrodes 44 and 46, for example. In the shown embodiment, cleaning system 10a may also include current sensor 27 located along electrical line 26 and/or within electrolysis cell 18 to detect the intensity of the current induced through electrolysis cell 18.

The applied voltage induces an electrical current across electrolysis cell 18 to generate an anolyte stream containing acidic water from the feed water flowing through anode chamber 38. This reaction also generates a catholyte stream containing an alkaline water from the feed water flowing through cathode chamber 40. The resulting anolyte stream exits anode chamber 38 through output line 48, and the catholyte stream exits cathode chamber 40 through output line 50.

In the case of a cation exchange membrane for barrier 42, upon application of a voltage potential across electrodes 44 and 46, cations originally present in the anode chamber 38 move across barrier 42 towards cathode electrode 46 while anions in anode chamber 38 move towards anode electrode 44. However, anions present in cathode chamber 40 are not able to pass through barrier 42, and therefore remain confined within cathode chamber 40.

While the electrolysis continues, the anions in the water bind to the metal atoms (e.g., platinum atoms) at anode electrode 44, and the cations in the water bind to the metal atoms (e.g., platinum atoms) at cathode electrode 46. These bound atoms diffuse around in two dimensions on the surfaces of the respective electrodes until they take part in further reactions. Other atoms and polyatomic groups may also bind similarly to the surfaces of electrodes 44 and 46, and may also subsequently undergo reactions. Molecules such as oxygen ($O_2$) and hydrogen ($H_2$) produced at the surfaces may enter small cavities in the liquid phase of the liquid (i.e., bubbles) as gases and/or may become solvated by the liquid phase of the water.

Surface tension at a gas-liquid interface is produced by the attraction between the molecules being directed away from the surfaces of electrodes 44 and 46 as the surface molecules are more attracted to the molecules within the liquid than they are to molecules of the gas at the electrode surfaces. In contrast, molecules of the bulk of the liquid are equally attracted in all directions. Thus, in order to increase the possible interaction energy, surface tension causes the molecules at the electrode surfaces to enter the bulk of the water. As a result of the electrolysis process, electrolysis cell 18 electrochemically activates the feed water by at least partially utilizing electrolysis and produces electrochemically-activated water in the form of the acidic anolyte stream (through anode chamber 38) and the basic catholyte stream (through cathode chamber 40).

If desired, the anolyte and catholyte streams can be generated in different ratios to one another through modifications to the structure of electrolysis cell 18. For example, electrolysis cell 18 can be configured to produce a greater volume of the catholyte stream compared to the anolyte stream if the primary function of the electrochemically-activated water is cleaning. Alternatively, for example, electrolysis cell 18 can be configured to produce a greater volume of the anolyte stream compared to the catholyte stream if the primary function of the electrochemically-activated water is sanitization. Also, the concentrations of reactive species in each can be varied.

For example, electrolysis cell 18 can have a 3:2 ratio of cathode plates (of cathode electrode 46) to anode plates (of anode electrode 44) for producing a greater volume of the catholyte stream compared to the anolyte stream. Each cathode plate is desirably separated from a respective anode plate by a respective barrier (e.g., an ion exchange membrane or diaphragm). Thus, in this embodiment, there are three cathode chambers 40 for two anode chambers 38. This configuration produces roughly 60% catholyte to 40% anolyte. Other ratios can also be used as individual cleaning and/or sanitizing needs may require. In this embodiment, control electronics 14 may also periodically reverse the polarities of electrodes 44 and 46 to provide an overall 1:1 ratio of the catholyte to anolyte, or other ratios.

In addition, water molecules in contact with anode electrode 44 are electrochemically oxidized to oxygen ($O_2$) and hydrogen ions ($H^+$) in the anode chamber 38, while water molecules in contact with the cathode electrode 46 are electrochemically reduced to hydrogen gas ($H_2$) and hydroxide ions ($OH^-$) in cathode chamber 40. The hydrogen ions in anode chamber 38 are allowed to pass through barrier 42 into cathode chamber 40 where the hydrogen ions are reduced to hydrogen gas while the oxygen gas in anode chamber 38 oxygenates the feed water to form the anolyte stream. Furthermore, since regular tap water typically includes sodium chloride and/or other chlorides, the anode electrode 44 oxidizes the chlorides present to form chlorine gas, as well as reactive oxidative species, such as hydrogen hypochlorite. As a result, a substantial amount of chlorine is produced and the pH of the anolyte stream becomes increasingly acidic over time.

As noted, water molecules in contact with cathode electrode 46 are electrochemically reduced to hydrogen gas and hydroxide ions (OH$^-$), while cations in the anode chamber 38 pass through barrier 42 into cathode chamber 40 when the voltage potential is applied. These cations are available to ionically associate with the hydroxide ions produced at the cathode electrode 46, while hydrogen gas bubbles form in the liquid. Substantial amounts of hydroxide ions accumulate over time in cathode chamber 40 and react with cations to form basic hydroxides. In addition, the hydroxides remain confined to cathode chamber 40 since barrier 42 (i.e., a cation-exchange membrane) does not allow the negatively charged hydroxide ions pass through. Consequently, substantial amounts of hydroxides are produced in cathode chamber 40, as well as reactive oxidative species, such as hydrogen peroxide, and the pH of the catholyte stream becomes increasingly alkaline over time.

Accordingly, the electrolysis process in electrolysis cell 18 generates concentrations of reactive species and forms metastable ions and radicals in anode chamber 38 and cathode chamber 40. The electrochemical activation process typically occurs by either electron withdrawal (at anode electrode 44) or electron introduction (at cathode electrode 46), which leads to alteration of physiochemical (including structural, energetic and catalytic) properties of the feed water. It is believed that the feed water becomes activated in the immediate proximity of the electrode surfaces where the electric field intensities can reach high levels.

In addition to electrochemical activation, the electrical current that is induced through electrolysis cell 18 also heats the streams flowing through anode chamber 38 and cathode chamber 40 of electrolysis cell 18. This heating increases the temperatures of the resulting streams from an initial inlet temperature of the feed water to an elevated temperature, which further increases the cleaning properties of the resulting streams.

In particular, the streams are primarily heated due to the electrical resistance of the water (or other liquid) when the electrical current is induced across electrolysis cell 18 (i.e., Joule heating). Pursuant to the Joule effect, the generated heat is proportional to the electrical resistance of the water times the square of the induced electrical current, as illustrated by Equation 1:

$$Q \sim I^2 \times R \quad \text{(Equation 1)}$$

where "Q" is the energy produced, "I" is the induced electrical current across electrolysis cell 18, and "R" is the electrical resistance of the water (or other liquid) flowing through electrolysis cell 18.

This generated heat accordingly heats the water in a manner that is based on the flow rate of the streams, the specific heat capacity of the water, and the initial temperature of the water, as illustrated by Equation 2:

$$Q \sim M \times C \times (T_{out} - T_{initial}) \quad \text{(Equation 2)}$$

where M is proportional to the flow rate of the streams through electrolysis cell 18, "C" is the specific heat capacity of the feed water (or other liquid), "$T_{out}$" is the elevated temperature of the of the resulting outlet streams through outlet lines 48 and 50, and "$T_{initial}$" is the initial temperature of the feed water entering electrolysis cell 18. Combining Equations 1 and 2 results in the relationship for heating the streams flowing through electrolysis cell 18, which is illustrated by Equation 3:

$$T_{out} \sim \frac{I^2 \times R}{M \times C} + T_{initial} \quad \text{(Equation 3)}$$

As such, the elevated temperatures of the outlet streams from electrolysis cell 18 are proportional to the current induced through electrolysis cell 18, and inversely proportional to the flow rate of the streams through electrolysis cell 18.

In the shown embodiment, outlet lines 48 and 50 are respectively connected to temperature sensors 52 and 54, which are connected to control electronics 14 over electrical lines 56 and 58. This arrangement allows control electronics 14 to monitor the temperatures of the streams flowing through outlet lines 48 and 50. In one embodiment, control electronics 14 utilizes one or more process control loops to adjust the flow rate of pump 16 and/or the induced current through electrolysis cell 18 to maintain the temperatures of the streams flowing through outlet lines 48 and 50 at a predetermined temperature, above a predetermined minimum temperature, or within a predetermined temperature range.

For example, if temperature sensors 52 and 54 detect a temperature that falls below a predetermined minimum temperature, control electronics 14 may slow down pump 16 to decrease the flow rate of the feed water to electrolysis cell 18. This accordingly increases the residence time of the feed water streams through electrolysis cell 18, thereby increasing the exposure time for a particular volume of the streams to the induced electrical current. As illustrated above in Equation 3, this accordingly increases the temperatures of the outlet streams flowing through outlet lines 48 and 50.

Alternatively, or in addition, the voltage applied to electrolysis cell 18 may be increased to correspondingly increase the induced electrical current. As also illustrated above in Equation 3, this also increases the temperatures of the outlet streams flowing through outlet lines 48 and 50. However, in comparison to decreasing the flow rate of the streams, the quadratic relationship of the induced electrical current allows a small increase in the applied voltage to substantially increase the resulting temperature of the outlet streams. Moreover, the quadratic relationship allows a small current and low flow rates to be utilized, which is particularly suitable for mobile floor cleaners and hand-held units.

Furthermore, varying the applied voltage rather than the flow rate allows the flow rate of the water through cleaning system 10 to be substantially constant. This is beneficial for maintaining a steady output rate of the thermally-enhanced treatment water from dispenser 20.

Examples of elevated temperatures for each of the streams flowing through outlet lines 48 and 50 (and dispenser 20) include temperatures of at least about 75° F., with particularly suitable temperatures ranging from about 85° F. to about 130° F., and with even more particularly suitable temperatures ranging from about 95° F. to about 110° F. It is found that increased temperatures of the outlet streams increase the cleaning capabilities of cleaning system 10*a*.

The elevated temperatures of the streams flowing through outlet lines 48 and 50 may alternatively be referred to based on the temperature increase or change relative to the inlet temperature of the feed water entering electrolysis cell 18 (i.e., $T_{out} - T_{initial}$). Examples of suitable temperature increases include increases from about 5° F. or more, with particularly suitable temperature increases ranging from about 15° F. to about 60° F., and with even more particularly suitable temperature increases ranging from about 25° F. to about 40° F.

Examples of suitable flow rates of the feed water into electrolysis cell 18 range from about 0.1 gallons/minute to about 1.0 gallon/minute, with particularly suitable flow rates ranging from about 0.1 gallons/minute to about 0.5 gallons/minute, and with even more particularly suitable flow rates ranging from about 0.1 gallons/minute to about 0.3 gallons/minute.

Examples of suitable voltages applied across electrolysis cell 18 range from about 5 volts to about 40 volts, and suitable induced electrical currents include currents of about 1.0 ampere or less. As mentioned above, control electronics 14 can provide a constant DC output voltage, a pulsed or otherwise modulated DC output voltage, or a pulsed or otherwise modulated AC output voltage to electrodes 44 and 46 of electrolysis cell 18. In one embodiment, control electronics 14 may apply the voltage supplied to electrodes 44 and 46 at a relative steady state. In this embodiment, control electronics 14 and/or electrical source 22 includes a DC/DC converter that uses a pulse-width modulation (PWM) control scheme to control voltage and current output.

For example, the DC/DC converter may use a pulse of about 15 kilohertz to produce the desired voltage to electrodes 44 and 46 in the range of about 5 volts to about 40 volts, such as a voltage of 15 volts with a power up to about 500 watts. In some embodiments, suitable power levels range from about 120 watts to about 300 watts. In other embodiments, suitable power levels range from about 120 watts to about 150 watts. The duty cycle is dependent on desired voltage and current output. For example, the duty cycle of the DC/DC converter can be 90%. Control electronics 14 and/or electrical source 22 can also be configured, if desired, to alternate the voltage applied to electrolysis cell 18 between a relative steady state voltage at one polarity and then a relative steady state voltage at the opposite polarity for equal time periods (e.g., 5 seconds each), or different time periods to bias towards anolyte or catholyte liquids.

Outlet lines 48 and 50 connect to dispenser 20 for dispensing one or both of the acidic anolyte stream and the basic catholyte stream at the elevated temperatures. For example, one or both of outlet lines 48 and 50 may include valves (not shown) for optionally directing the streams from either outline line 48 or outlet line 50 through recovery line 60 to recovery tank 62 (illustrated with broken lines). This allows dispenser 20 to selectively dispense either or both of the thermally-enhanced anolyte stream or the thermally-enhanced catholyte stream based on desired cleaning and/or sanitizing purposes.

Dispenser 20 may be any suitable dispenser component, such as a spray dispenser, for example. Dispenser 20 may also include one or more scrubbing components (not shown) to assist in the cleaning operation. For example, dispenser 20 may include one or more brushes, such as bristle brushes, pad scrubbers, microfibers, or other hard (or soft) floor surface scrubbing elements (not shown). As mentioned above, during operation, cleaning system 10*a* may generate the thermally-enhanced anolyte stream and the thermally-enhanced catholyte stream in an on-demand manner, each or both of which can be dispensed from dispenser 20 for cleaning. In one embodiment, cleaning system 10*a* combines all of the thermally-enhanced anolyte and catholyte streams to form a combined stream and dispenses substantially all of the combined thermally-enhanced anolyte and catholyte streams without intermediate storage of either the anolyte stream or catholyte stream, and without feedback of any of the anolyte stream or catholyte stream into electrolysis cell 18.

As can be appreciated, the above-discussed suitable flow rates, voltage, and current ranges may quickly heat the feed water from its initial temperature (e.g., about 70° F.) to the elevated temperature. This, combined with an on-demand activation of pump 16 and electrolysis cell 18, is beneficial for quickly supplying electrochemically-activated water to dispenser 20 at the elevated temperature for cleaning surfaces.

This combination is particularly suitable for use in mobile cleaning systems. Conventional mobile cleaning systems are typically pre-filled with a liquid, such as tap water, well in advance of their use. For example, after a cleaning operation, a user may fill the mobile cleaning system with tap water for use during the next day. Maintaining the water at the elevated temperature during the overnight period requires a substantial amount of power that becomes expensive over an extended period of time. Alternatively, the pre-filled water in such systems may be heated immediately prior to use. However, this creates a lag time before the given mobile cleaning system can be used.

Instead, cleaning system 10*a* can be pre-filled with any suitable liquid (e.g., tap water), allowed to sit overnight, and heat the liquid in an on-demand manner in electrolysis cell 18. This quickly heats the liquid streams while also electrochemically activating the liquid streams to produce a thermally-enhanced anolyte stream and a thermally-enhanced catholyte stream, each or both of which can be dispensed from dispenser 20 for cleaning surfaces.

Figure 2:
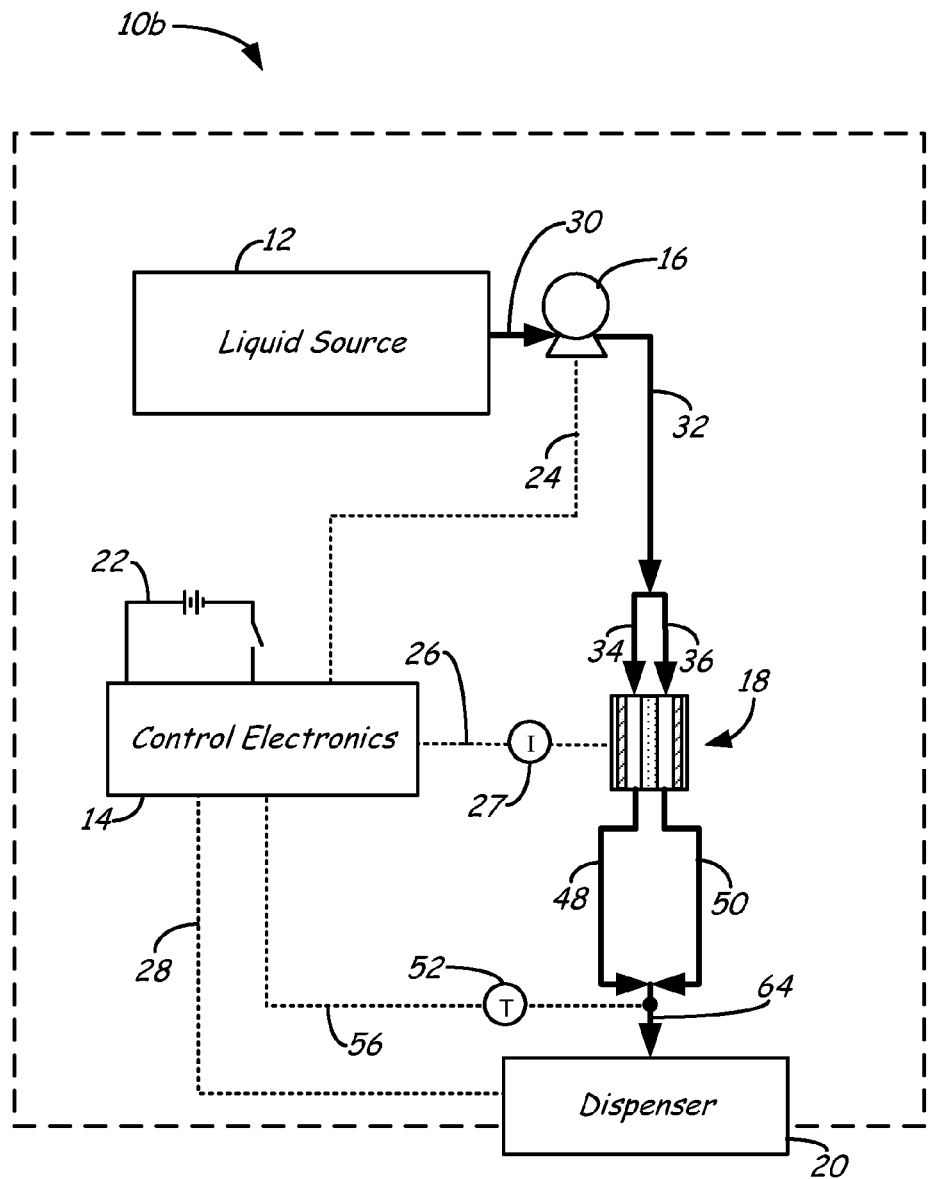
FIG. 2 is a schematic illustration of a first alternative cleaning system of the present disclosure, which includes an electrolysis cell having combined outlet streams.

FIGS. 2-5 illustrate systems 10*b*-10*e*, which are alternative cleaning systems to cleaning system 10*a* (shown in FIG. 1) for generating thermally-enhanced, electrochemically-activated liquids. As shown in FIG. 2, system 10*b* is similar to system 10*a*, where outlet lines 48 and 50 converge to combined outlet line 64.

As described in Field et al. U.S. Patent Publication No. 2007/0186368, it has been found that the anolyte and catholyte streams can be blended together within the distribution system of a cleaning apparatus and/or on the surface or item being cleaned while at least temporarily retaining beneficial cleaning and/or sanitizing properties. Although the anolyte and catholyte streams are blended, they are initially not in equilibrium and therefore temporarily retain their enhanced cleaning and sanitizing properties. In the embodiment shown in FIG. 2, because each stream is heated in electrolysis cell 18 to the elevated temperature, the combined streams at combined outlet line 64 may retain the elevated temperature for dispensing via dispenser 20.

Figure 3:
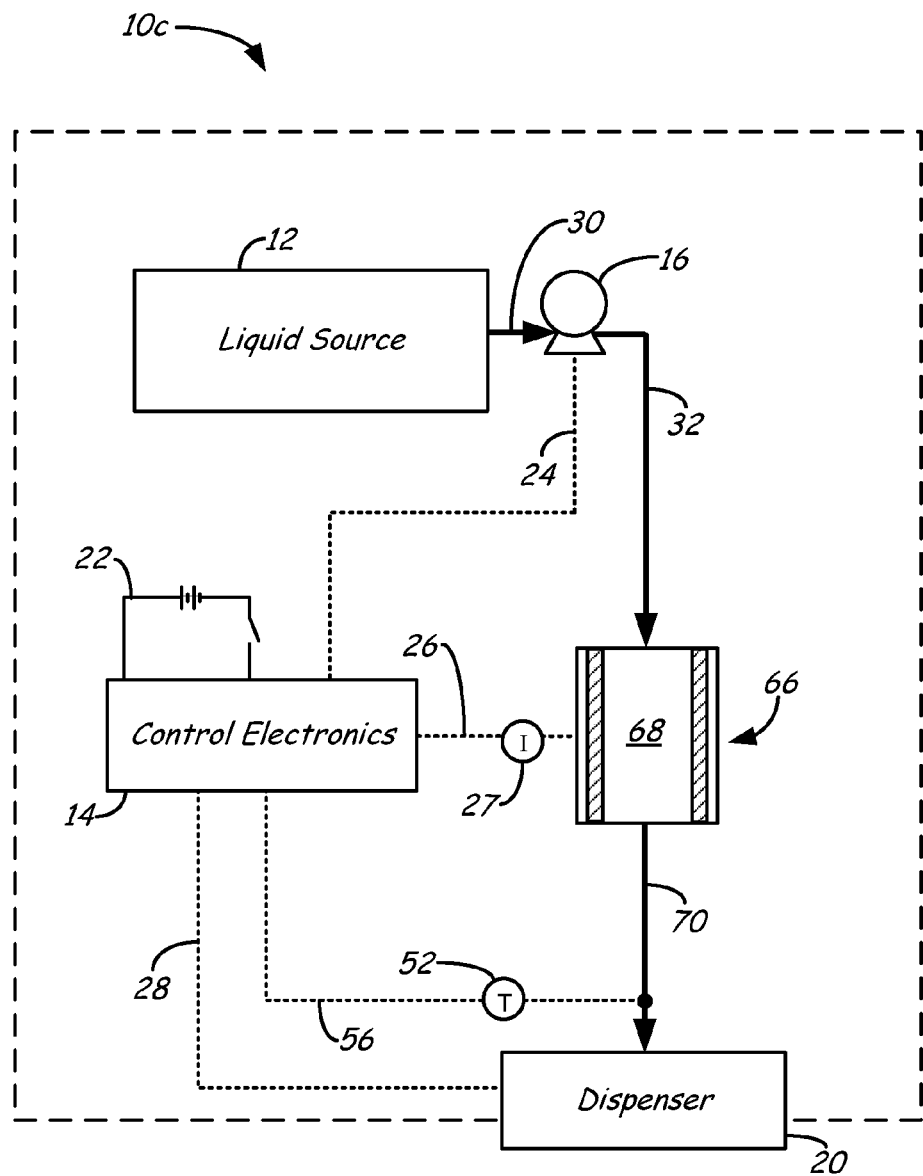
FIG. 3 is a schematic illustration of a second alternative cleaning system of the present disclosure, which includes an electrolysis cell without a cell barrier.

FIG. 3 illustrates cleaning system 10*c*, which is similar to cleaning systems 10*a* and 10*b*. In this embodiment, however, electrolysis cell 18 is replaced with electrolysis cell 66 having a single reaction chamber 68 for anode electrode 44 and cathode electrode 46 (i.e., no barrier 42). As such, feed line 32 and outlet line 70 directly connect to reaction chamber 68.

During operation, water (or other liquid) is introduced into reaction chamber 68, and a voltage potential is applied between electrodes 44 and 46. This causes water molecules in contact with or near anode electrode 44 electrochemically oxidize to oxygen ($O_2$) and hydrogen ions ($H^+$), while water molecules in contact or near cathode electrode 46 are electrochemically reduce to hydrogen gas ($H_2$) and hydroxide ions ($OH^-$). Other reactions can also occur and the particular reactions depend on the components of the water (e.g., formation of reactive oxidative species, such as hydrogen hypochlorite and hydrogen peroxide). The reaction products from both electrodes 44 and 46 are able to mix and form an oxygenated fluid (for example) since there is no physical barrier separating the reaction products from each other.

Omitting a barrier between electrodes 44 and 46 allows the flowing water to heat in a uniform manner, as opposed to heating separate streams. This accordingly can increase the heating rate of the water flowing through electrolysis cell 66.

Figure 4:
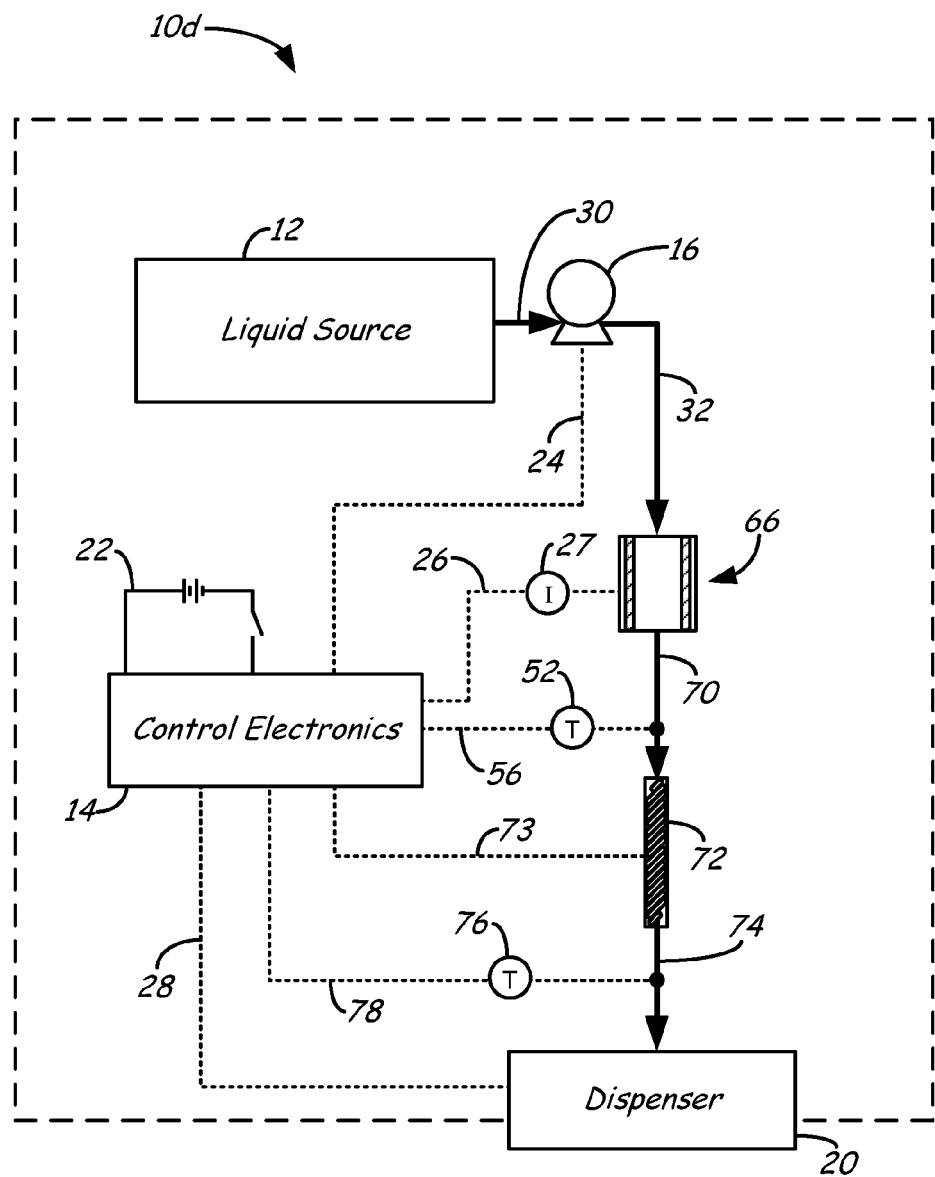
FIG. 4 is a schematic illustration of a third alternative cleaning system of the present disclosure, which includes an electrolysis cell and a heating element located downstream from the electrolysis cell.

FIG. 4 illustrates cleaning system 10*d*, which is also similar to cleaning systems 10*a*-10*c*. In this embodiment, cleaning system 10*d* also includes a separate additional heating element 72 located downstream from outlet line 70, and controlled by control electronics 14 over electrical line 73. Heating element 72 may be any suitable heat-exchange component for further heating the electrochemically-activated water from electrolysis cell 66. For example, heating element 72 may be a metallic coil retained within the walls of outlet line 70 to conductively heat the electrochemically-activated water to a desired elevated temperature.

While illustrated with electrolysis cell 66, cleaning system 10*d* may alternatively utilize electrolysis cell 18 in a split stream manner as shown in FIG. 1 or in a blended stream manner as shown in FIG. 2. In the split stream embodiment shown in FIG. 1, heating elements 72 may be located downstream from electrolysis cell 18 at one or both of outlet lines 48 and 50, prior to dispenser 20. In the blended stream embodiment shown in FIG. 2, heating element 72 may be located at combined outlet line 64, downstream from electrolysis cell 18 and outlet lines 48 and 50, and prior to dispenser 20.

Cleaning system 10*d* also includes outlet line 74 between heating element 72 and dispenser 20, and temperature sensor 76, which allows control electronics 14 to monitor the temperature of the electrochemically-activated water flowing through outlet line 74 (via electrical connection 78). The use of heating element 72 provides control electronics 14 even greater control over the heating profile of the feed water.

Figure 5:
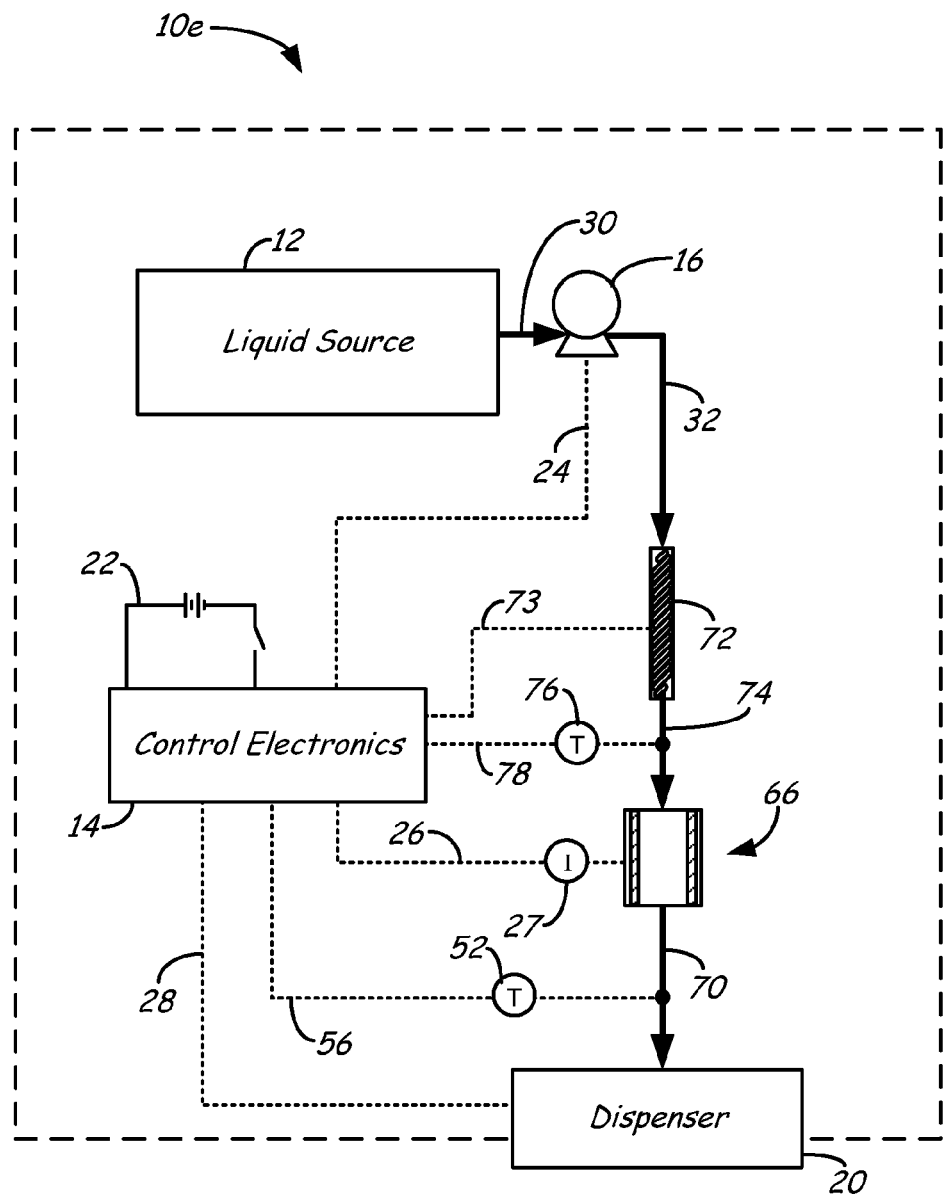
FIG. 5 is a schematic illustration of a fourth alternative cleaning system of the present disclosure, which includes an electrolysis cell and a heating element located upstream from the electrolysis cell.

FIG. 5 illustrates cleaning system 10*e*, which is also similar to cleaning system 10*d*, where heating element 72 and temperature sensor 76 are located upstream from electrolysis cell 66 (e.g., between pump 16 and electrolysis cell 66). While illustrated with electrolysis cell 66, cleaning system 10*e* may alternatively utilize electrolysis cell 18 in the split stream manner as shown in FIG. 1 or in the blended stream manner as shown in FIG. 2.

In this embodiment, heating element 72 may be used to heat the feed water to a desired temperature prior to the electrolysis reaction in electrolysis cell 66. Pre-heating the feed water prior to electrolysis in an electrolysis cell (e.g., electrolysis cell 66) reduces the electrical current required to electrochemically activate the feed water. For example, when heating elements 72 heats the feed water to an elevated temperature (e.g., 100° C.), electrolysis cell 66 may operate with lower induced electrical currents, such as about 0.5 amperes or less, and even 0.3 amperes or less, for the same applied voltages (e.g., from about 5 volts to about 40 volts). This may reduce scaling issues in electrolysis cell 66.

Figure 6:
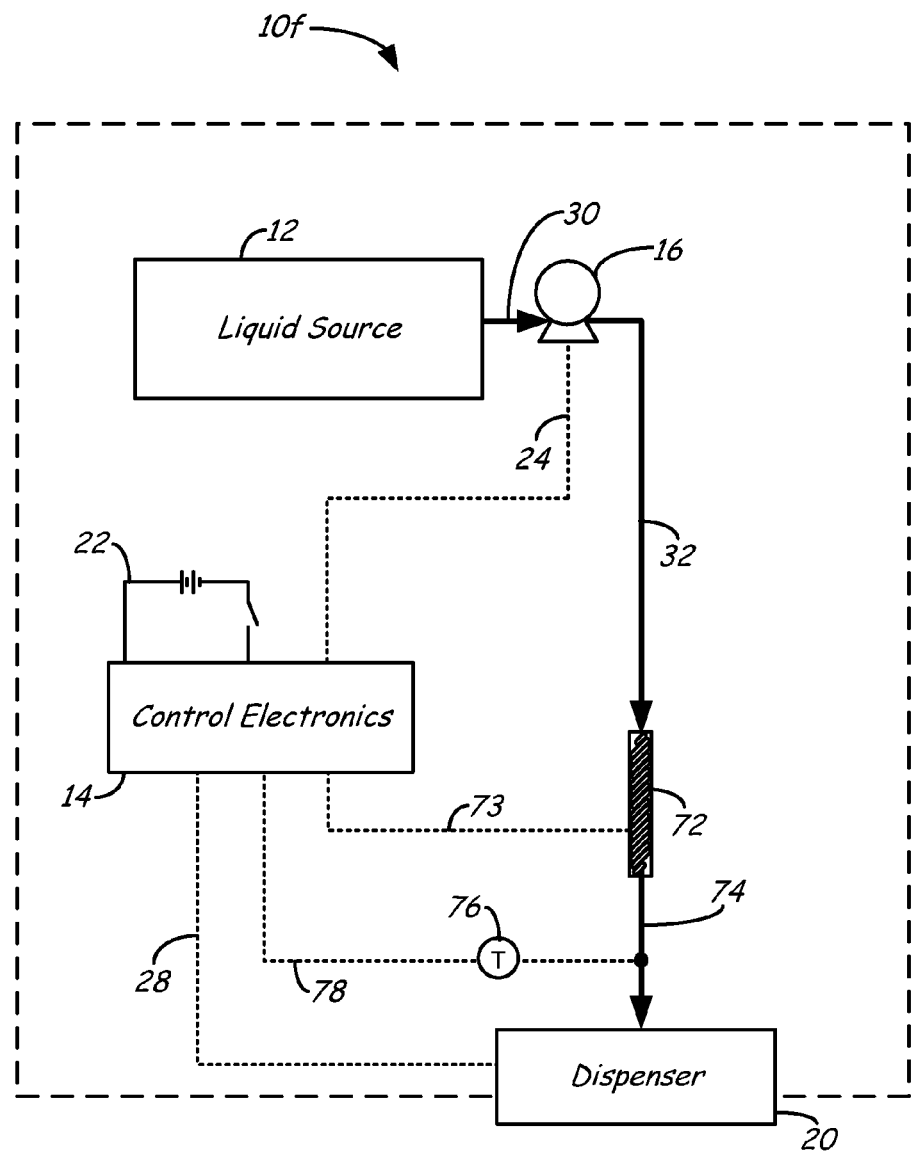
FIG. 6 is a schematic illustration of a fifth alternative cleaning system of the present disclosure, which includes a heating element for heating a feed liquid.

FIG. 6 illustrates cleaning system 10*f*, which is another alternative to cleaning system 10*d*, in which electrolysis cell 66 is omitted. In this embodiment, the feed water is heated from its initial temperature to the desired elevated temperature with the use of heating element 72.

The cleaning systems of the present disclosure (e.g., cleaning systems 10*a*-10*f*) are suitable for use in a variety of cleaning environments, such as industrial, commercial, and residential environments. This is particularly true with cleaning systems 10*a*-10*e*, which also electrochemically activate the feed liquids.

Figure 7:
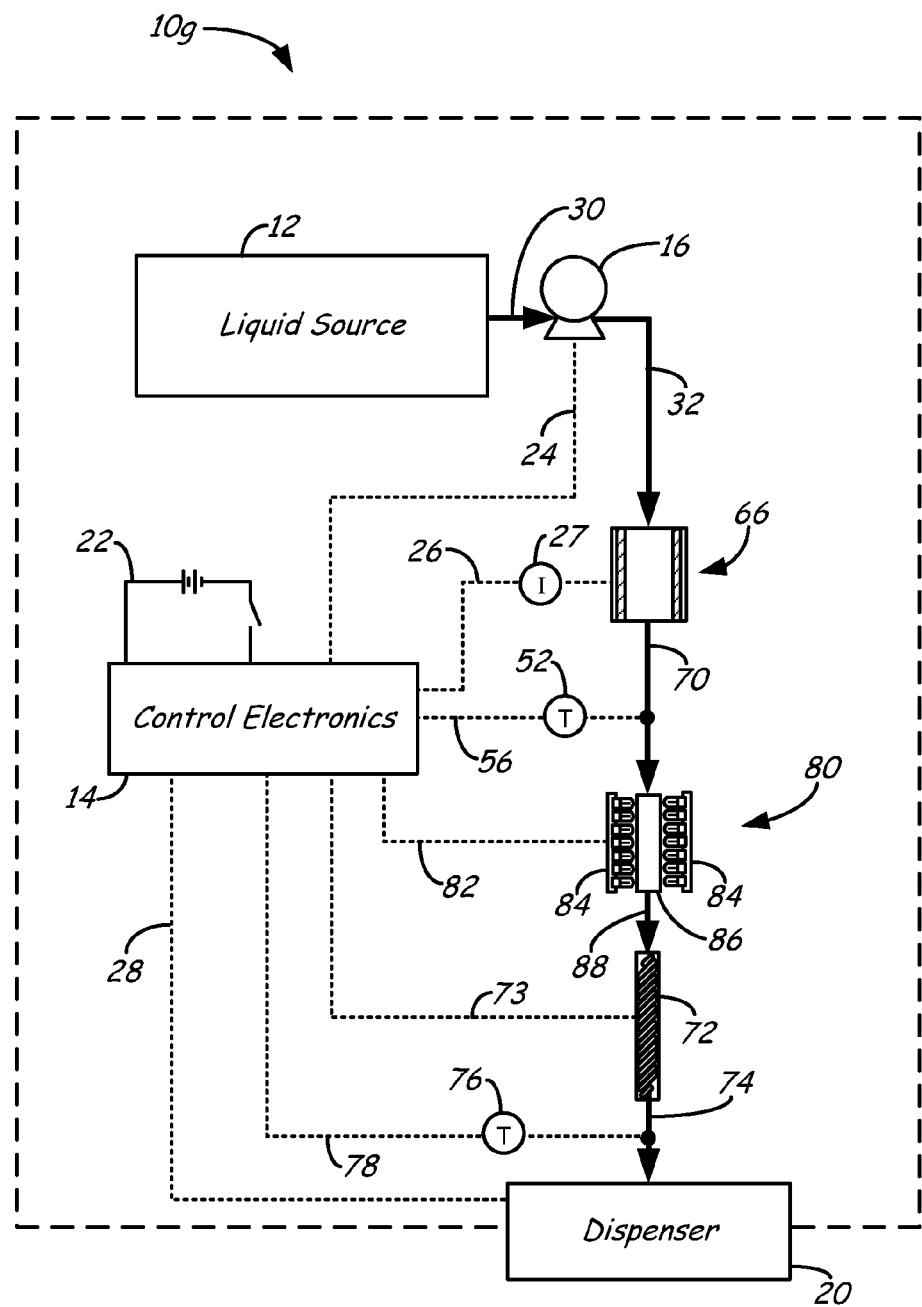
FIG. 7 is a schematic illustration of a sixth alternative cleaning system of the present disclosure, which includes an electrolysis cell, a heating element, and an ultraviolet (UV) radiation generator, where the heating element and the UV-radiation generator are located downstream from the electrolysis cell, and adjacent to a dispenser.

FIG. 7 illustrates cleaning system 10*g*, which is a further alternative to cleaning systems 10*a*-10*e*. In this embodiment, cleaning system 10*g* includes UV-radiation generator 80 disposed between electrolysis cell 66 and heating element 72, which is controlled by control electronics 14 over electrical line 82. Generator 80 includes one or more light emitters 84 that emit electromagneticradiation (such as in the ultraviolet wavelength range) toward the electrochemically-activated water flowing through conduit 86, based on the electrical control from control electronics 14. In one embodiment, light emitters 84 include one or more arrays of light-emitting diodes configured to emit UV radiation.

Conduit 86 has an upstream end coupled to outlet line 70 and a downstream end coupled to outlet line 88, each in a sealed manner. As such, the electrochemically-activated water enters conduit 86 from electrolysis cell 66, and exits conduit 86 into outlet line 88 and heating element 72. Conduit 86 may be fabricated as a tube or similar structure from one or more materials that facilitate the transmission of UV radiation from light emitters 84 to the flowing electrochemically-activated water. The material(s) for conduit 86 are also desirably resistant to UV-radiation exposure without degradation. Examples of suitable materials include UV-resistant polymer materials, quartz materials, and the like.

While illustrated with electrolysis cell 66, cleaning system 10*g* may alternatively utilize electrolysis cell 18 in the split stream manner as shown in FIG. 1 or in the blended stream manner as shown in FIG. 2. In the split stream embodiment shown in FIG. 1, generators 80 and heating elements 72 may be located downstream from electrolysis cell 18 at one or both of outlet lines 48 and 50, prior to dispenser 20. In the blended stream embodiment shown in FIG. 2, generator 80 and heating element 72 may be located at combined outlet line 64, downstream from electrolysis cell 18 and outlet lines 48 and 50, and prior to dispenser 20. Furthermore, while temperature sensor 52 is illustrated at outlet line 70, in alternative embodiments, temperature sensor 52 (or an additional temperature sensor) may be located downstream from generator 80 at outlet line 88.

During operation, electrolysis cell 66 (or electrolysis cell 18) generates electrochemically-activated water from feed water, as discussed above. For feed water comprising tap water, the electrolysis process generates reactive oxidative species in the electrochemically-activated water, such as hydrogen hypochlorite and hydrogen peroxide. The electrochemically-activated water then flows through outlet line 70 to conduit 86.

The electrolysis of tap water has shown the capability to generate a number of reactive oxidative species, including hydrogen peroxide and hypochlorite. The oxidative power of these species can be enhanced by the application of the appropriate wavelength of light (i.e. ultraviolet), generating reactive chemical radicals. As the electrochemically-activated water flows through conduit 86, light emitters 84 emit the UV radiation, which excites the reactive oxidative species in the electrochemically-activated water, thereby increasing their oxidative potentials. For example, the UV radiation may generate hydroxyl radicals from hydrogen hypochlorite, hydroxidehydrogen peroxide. These radicals have an increased oxidation potential compared to their precursors, which increases the cleaning capabilities of the electrochemically-activated water. Performance is also enhanced by the addition of thermal energy. The adjuvant effect of increased thermal energy increases chemical kinetics, the rate of diffusion and solubility.

The electrochemically-activated water is desirably exposed to the UV radiation for a sufficient duration to excite the reactive oxidative species to their increased oxidative states. The duration may be based on multiple factors, such as the power density of the UV radiation, the exposure area, length and diameter of conduit 86, the flow rate of the electrochemically-activated liquid, the composition of the electrochemically-activated water, the wavelength of the UV radiation, and the like.

For example, the mechanism of the reaction for hydrogen peroxide is the generation of hydroxyl radical, a reactive molecule due to the unpaired electron:

$$H_2O_2 + h\nu \rightarrow 2.OH$$

The quantum yield is defined as the fraction of molecules (e.g., hydrogen peroxide) that react for each photon of light that is adsorbed:

$$\Phi = \frac{\text{\# moles of species decomposed}}{\text{\# einsteins (moles of photons) adsorbed}}$$

When illuminated with UV radiation having a wavelength of 254 nanometers, every photon of light adsorbed results in the generation of a hydroxyl radical.

Hydrogen hypochlorite in solution exits in two forms, namely hypochlorous acid (HOCl) and the hypochlorite anion (OCl⁻), depending on the pH of the solution:

$$HOCl \rightleftharpoons OCl^- + H^+ (pK_a = 7.5 \text{ at } 25° C.)$$

The equilibrium is important because the pH of the solution will determine the form in which the hypochlorite exists (HOCl or OCl⁻). In solutions of a lower pH, an additional equilibrium exists between hypochlorous acid and chlorine gas.

The activation range for hypochlorite is also in the UV-wavelength of the spectrum and differs between hypochlorous acid (HOCl) and hypochlorite anion (OCl⁻). The hypochlorite anion has a stronger adsorption (maximum absorption at 292 nanometers) than found for hypochlorous acid. However, at a wavelength of 254 nanometers, which is the predominant wavelength of low pressure mercury UV lamps, the adsorption is similar for hypochlorous acid and hypochlorite anion.

Hypochlorite also reacts when to UV light, forming hydroxyl radicals. The photolysis of the two forms of hypochlorite is shown below. Photolysis of hypochlorous acid $$HOCl + h\nu \rightarrow .O^- + .Cl$$

Photolysis of Hypochlorite Anion:

$$OCl^- + h\nu \rightarrow .OH^- + .Cl$$

$$.O^- + H_2O \rightarrow .OH + OH^-$$

Pursuant to Equation 4 (shown above), when illuminated with UV radiation having a wavelength of 254 nanometers, every photon of light adsorbed results in the generation of a radical for hypochlorous acid at a pH of about 5, and every photon of light adsorbed results in the generation of a radical for hypochlorite anion at a pH of about 10.

Accordingly, examples of suitable wavelengths for the UV radiation range from about 100 nanometers to about 400 nanometers, with particularly suitable wavelengths ranging from about 230 nanometers to about 350 nanometers, and even more particularly suitable wavelengths ranging from about 250 nanometers to about 300 nanometers. Suitable flow rates for the electrochemically-activated water through conduit 86 include those discussed above for cleaning system 10*a* (shown in FIG. 1), for example.

The oxidatively-enhanced water then flows through outlet line 88 to heating element 72 for further heating the water, as discussed above. This heating increases the temperature of the oxidatively-enhanced water from an initial inlet temperature to an elevated temperature, providing treatment water that is both oxidatively and thermally enhanced for cleaning. Additionally, the use of heating element 72 provides control electronics 14 even greater control over the heating profile of the treatment water. The oxidatively and thermally enhanced treatment water then flows through outlet line 74 to dispenser 20.

Cleaning system 10*g* may generate the oxidatively and thermally enhanced treatment water in an on-demand manner, which can be dispensed from dispenser 20 for cleaning. In one embodiment, cleaning system 10*g* dispenses substantially all of the oxidatively and thermally enhanced treatment water upon activation without intermediate storage, and without feedback of into electrolysis cell 66.

In embodiments in which the treatment water is generated in the blended stream manner as shown in FIG. 2, or from a non-barrier electrolysis cell (e.g., electrolysis cell 66), the anolyte and catholyte portions of the electrochemically-activated water are initially not in equilibrium and therefore temporarily retain their enhanced cleaning and sanitizing properties. To prevent the anolyte and catholyte portions from obtaining equilibrium prior to be dispensed, the electrochemically-activated water desirably flows through generator 80, outlet line 88, heating element 72, outlet line 74, and dispenser 20 within a short duration, such as about 30 seconds or less. In a specific embodiment, the electrochemically-activated water is dispensed from dispenser within 5 seconds, such as between 4-5 second, from activation within electrolysis cell 66 (or cell 18).

As can be appreciated, this is counter to the operations of generator 80 and heating element 72, which are more efficient when the electrochemically-activated water flows slowly through them (i.e., longer residence times). The above discussed suitable flow rates provide a good balance between the operational efficiencies of generator 80 and heating element 72, and maintaining non-equilibrium in the resulting treatment water. To further maintain short flow durations for the electrochemically-activated water, electrolysis cell 66, generator 80, heating element 72, and dispenser 20 are desirably positioned close to each other to reduce the distance that the electrochemically-activated water is required to flow through cleaning system 10*g* before being dispensed.

In a further embodiment, cleaning system 10*g* is configured such that electrolysis cell 66 is off-board the system. For example, the liquid source 12 can include a tank that is filled with an electrochemically-activated anolyte liquid, catholyte liquid or a combination of anolyte and catholyte liquid, which has been electrochemically activated by an electrolysis cell that is distinct and not connected to system 10*g*. In operation, cleaning system 10*g* treats the electrochemically-activate liquid by UV generator(s) 80 and/or heating element 72 prior to dispensing through dispenser 20.

In yet another embodiment, control electronics 14 includes a user input (not shown in FIG. 7), which selectively enables and disables heating element 72. Since heating element 72 may consume a significant amount of battery power in mobile applications, it may be desirable to have heating element 72 disabled in a normal operating mode. For heavier cleaning operations, requiring a further elevated liquid temperature, the user may actuate the user input to enable heating element 72, at which time control electronics 14 applies power to the heating element.

In one embodiment, the present disclosure is directed to a method of using a cleaning system (e.g., cleaning systems 10a-10g) in cold-room cleaning environments, such as food processing rooms that require cold temperatures (e.g., below 0° C.). Conventional cleaning systems that operate in cold rooms typically require additives (e.g., glycols) in their cleaning solutions to prevent the cleaning solutions from freezing in the cold rooms. The cleaning systems of the present disclosure, however, heat the feed water prior to dispensing. This reduces or eliminates the need for such additives, which can otherwise leave residues if not properly removed. Accordingly, in this embodiment, the feed liquid is desirably free or substantially free of glycol-based compositions.

The method includes the steps of pumping a feed liquid at room temperature (e.g., 25° C.) from a liquid source to an electrolysis cell, electrochemically activating and heating the feed liquid in the electrolysis cell (and optionally heating with an additional heating element) to provide an electrochemically-activated liquid at an elevated temperature, and dispensing the electrochemically-activated liquid to a surface in a cold-room environment.

Figure 8B:
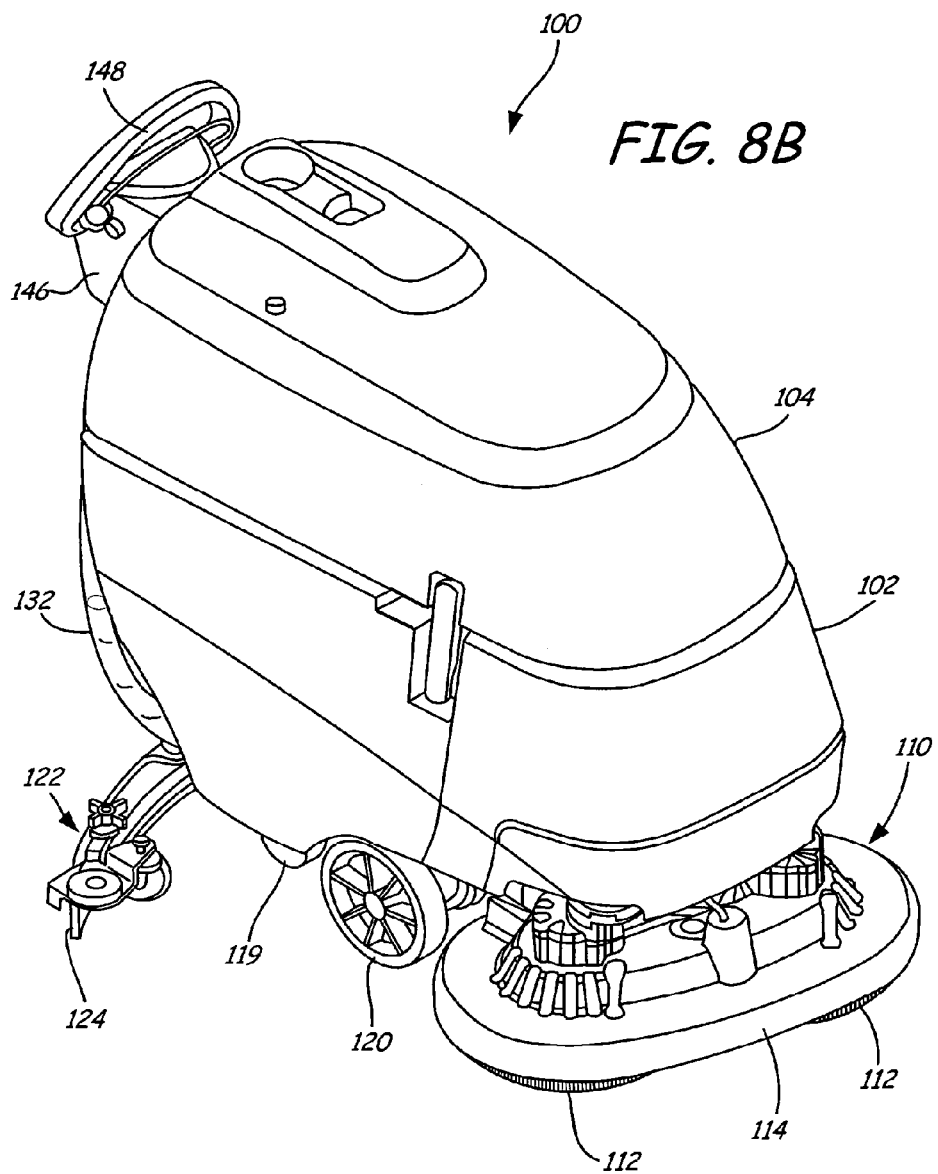
FIG. 8B is a perspective view of the mobile hard floor surface cleaner shown in FIG. 7A with its lid in a closed state.
Figure 8C:
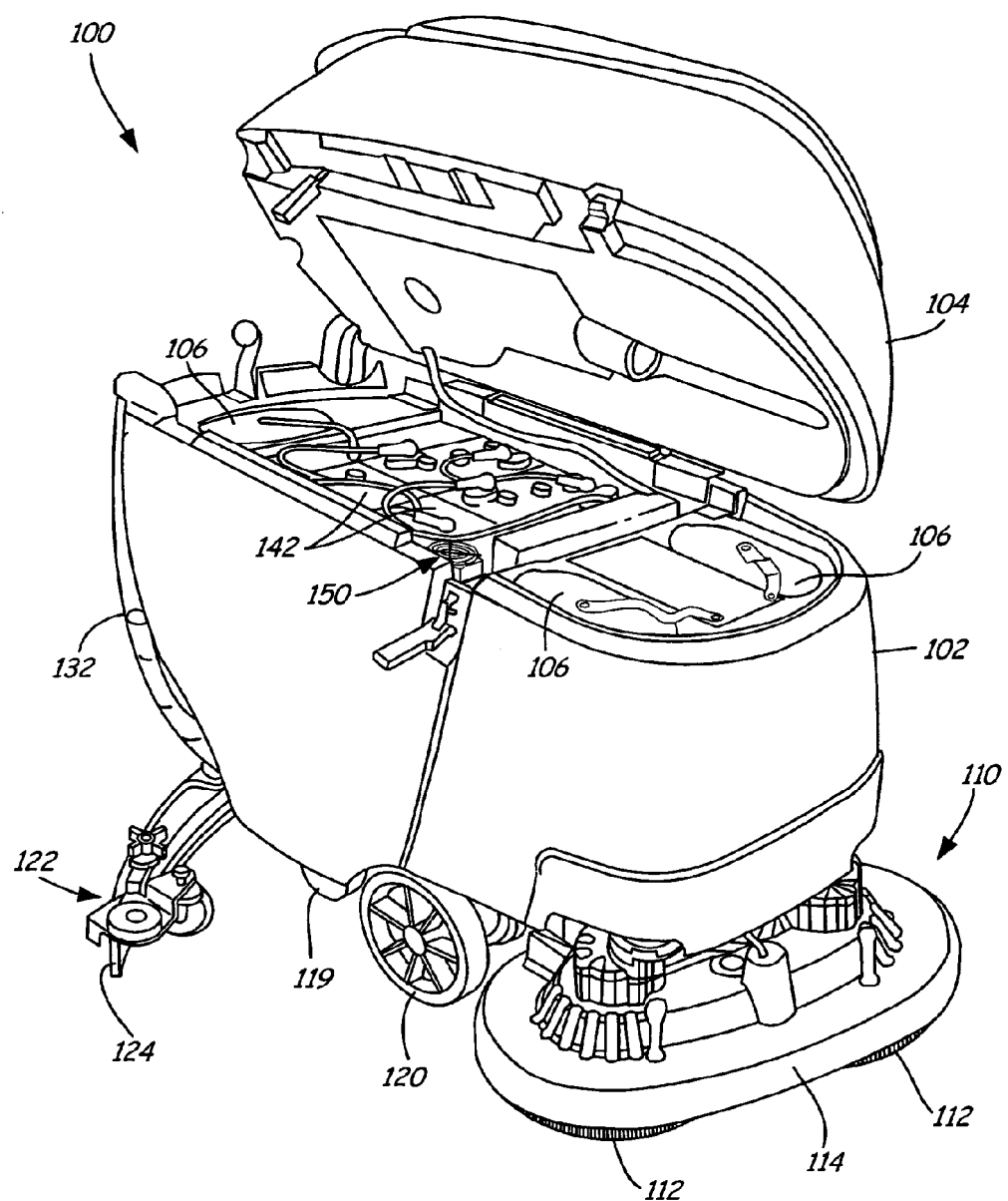
FIG. 8C is a perspective view of the mobile hard floor surface cleaner shown in FIG. 7A with its lid in an open state.

FIGS. 8A-8C illustrate a mobile hard floor surface cleaner 100 in accordance with one or more exemplary embodiments of the present disclosure, and may include the components of one or more of cleaning systems 10a-10f (shown in FIGS. 1-7). Further discussion of suitable components for cleaner 100 are disclosed in Field et al., U.S. Patent Application Publication No. 2007/0186368, the disclosure of which is incorporated by reference in its entirety.

In one example, cleaner 100 is substantially similar to the Tennant T5 Scrubber-Dryer equipped with the equipment under the "EC-H2O™" Technology from Tennant Company, Minneapolis, Minn., for example, which has been modified to include the components and/or operating characteristics discussed above for one or more of cleaning systems 10a-10f (shown in FIGS. 1-6).

In this example, cleaner 100 is a walk-behind cleaner used to clean hard floor surfaces, such as concrete, tile, vinyl, terrazzo, etc. Alternatively, for example, cleaner 100 can be configured as a ride-on, attachable, or towed-behind cleaner for performing a scrubbing operation as described herein. In a further example, cleaner 100 can be adapted to clean soft floors, such as carpet, or both hard and soft floors in further embodiments. Cleaner 100 may include electrical motors powered through an on-board power source, such as batteries, or through an electrical cord. Alternatively, for example, an internal combustion engine system could be used either alone, or in combination with, the electric motors.

Cleaner 100 generally includes a base 102 and a lid 104, which is attached along one side of the base 102 by hinges (not shown) so that lid 104 can be pivoted up to provide access to the interior of base 102. Base 102 includes a tank 106 for containing a feed liquid or a primary cleaning and/or sanitizing liquid component (such as regular tap water) to be treated and applied to the floor surface during cleaning/sanitizing operations. Alternatively, for example, the liquid can be treated onboard or offboard cleaner 100 prior to containment in tank 106. Tank 106 can have any suitable shape within base 102, and can have compartments that at least partially surround other components carried by base 102.

Base 102 carries a motorized scrub head 110, which includes one or more scrubbing members 112, shrouds 114, and a scrubbing member drive 116. Scrubbing member 112 may include one or more brushes, such as bristle brushes, pad scrubbers, microfibers, or other hard (or soft) floor surface scrubbing elements. Drive 116 includes one or more electric motors to rotate the scrubbing member 112. Scrubbing members 112 may include a disc-type scrub brush rotating about a generally vertical axis of rotation relative to the floor surface, as shown in FIGS. 8A-8C.

Alternatively, for example, scrubbing members 112 may include one or more cylindrical-type scrub brushes rotating about a generally horizontal axis of rotation relative to the hard floor surface. Drive 116 may also oscillate scrubbing members 112. Scrub head 110 may be attached to cleaner 100 such that scrub head 110 can be moved between a lowered cleaning position and a raised traveling position. Alternatively, for example, cleaner 100 can include no scrub head 110 or scrub brushes.

Base 102 further includes a machine frame 117, which supports source tank 106 on wheels 118 and castors 119. Wheels 118 are driven by a motor and transaxle assembly, shown at 120. The rear of the frame carries a linkage 121 to which a fluid recovery device 122 is attached. In the embodiment of FIGS. 8A-8C, the fluid recovery device 122 includes a vacuum squeegee 124 that is in vacuum communication with an inlet chamber in recovery tank 108 through a hose 126. The bottom of source tank 106 includes a drain 130, which is coupled to a drain hose 132 for emptying source tank 106. Similarly, the bottom of recovery tank 108 includes a drain 133, which is coupled to a drain hose 134 for emptying recovery tank 108. Alternatively, for example, one or both of the source tank and recovery tank and related systems can be housed in or carried by a separate apparatus.

In a further exemplary embodiment, the fluid recovery device includes a non-vacuumized mechanical device for lifting the soiled solution away from the floor surface and conveying the soiled solution toward a collection tank or receptacle. The non-vacuumized mechanical device can include, for example, a plurality of wiping media such as pliable material elements, which are rotated into contact with the floor surface to engage and lift the soiled solution from the floor surface.

In a further embodiment, cleaner 100 is equipped without a scrub head, wherein the liquid is dispensed to floor 125 for cleaning or sanitizing without a scrubbing action. Subsequently, fluid recovery device 122 recovers at least part of the dispensed liquid from the floor. In another embodiment, cleaner 100 includes a wand sprayer and extractor or other attachment (not shown) that can be used to clean off-floor surfaces.

Cleaner 100 can further include a battery compartment 140 in which batteries 142 reside. Batteries 142 provide power to drive motors 116, vacuum fan or pump 144, and other electrical components of cleaner 100. Vacuum fan 144 is mounted in the lid 104. A control unit 146 mounted on the rear of the body of cleaner 100 includes steering control handles 148 and operating controls and gages for cleaner 100.

Liquid tank 106 is a liquid source (e.g., liquid source 20) filled with a feed liquid to be treated for cleaning and/or sanitizing use, such as regular tap water. In one embodiment, the feed liquid is free or substantially free of any surfactant, detergent or other cleaning chemical. Cleaner 100 further includes an output fluid flow path 160, which includes a pump 164 (corresponding to pump 14), electrolysis cell 162 (corresponding to electrolysis cells 18 or 66, for example), UV-radiation generator 166 (corresponding to generator 80), and heating element 167 (corresponding to heating element 72).

Liquid tank 106, electrolysis cell 162, pump 164, generator 166, and heating element 167 can be positioned anywhere on cleaner 100. In one embodiment, electrolysis cell 162 is mounted within a housing 150 that is carried within base 102. Pump 164 is mounted beneath source tank 106 and pumps water from tank 106 along flow path 160, through electrolysis cell 162, generator 166, and heating element 167 to the vicinity of scrub head 110 and ultimately to floor 125, wherein recovery device 122 recovers the soiled liquid and returns it to recovery tank 108.

The arrows in FIG. 8A illustrate the direction of liquid flow from tank 106, through flow path 160, to floor 125 and then from recovery device 122 to recovery tank 128. While electrolysis cell 162 is illustrated further upstream from generator 166 and heating element 167, in one embodiment, electrolysis cell 162, generator 166, and heating element 167 are each located adjacent to scrub head 110 to reduce the length of flow path 160, such as in region 168, to reduce the residence time of the electrochemically-activated liquid in cleaner 100. Alternatively, flow path 160 may be thermally insulated to reduce heat loss as the electrochemically-activated liquid flows from electrolysis cell 162 to scrub head 110.

In one embodiment of the disclosure, the control unit 146 is configured to operate pump 164, electrolysis cell 162, generator 166, and heating element 167 in an "on demand" fashion, as discussed above. Pump 164 is in an "off" state and one or more of electrolysis cell 162, generator 166, and heating element 167 are de-energized when cleaner 100 is at rest and not moving relative to the floor being cleaned. Control unit 146 switches pump 164 to an "on" state and energizes electrolysis cell 162, generator 166, and/or heating element 167 when cleaner 100 travels in a forward direction relative to the floor, as indicated by arrow 169. In the "on" state, pump 164 pumps water from tank 106 through flow path 160 to the vicinity of scrub head 110. Thus, electrolysis cell 162, generator 163, and heating element 167 generate and deliver the oxidatively and thermally-enhanced, treatment water "on demand", as discussed above. For example, cleaner 100 may dispense substantially all of the thermally-enhanced anolyte and catholyte streams without intermediate storage of either the anolyte stream or catholyte stream, and without feedback of any of the anolyte stream or catholyte stream into electrolysis cell 162.

As described in more detail below, flow path 160 can include a single, combined output flow path for the heated and blended catholyte and anolyte electrochemically-activated water produced at the output of electrolysis cell 162 or can include separate paths that can combine somewhere along flow path 160 or at the dispenser or remain separate along the entire length of flow path 160. The separate flow streams can have a common fluid dispenser near scrub head 110 or can be routed to separate liquid dispensers. Pump 164 can represent a single pump or multiple pumps for multiple flow paths.

In an embodiment in which cleaner 100 is configured to selectively dispense one or both the anolyte or catholyte electrochemically-activated water outputs, cleaner 100 can also include one or more waste water flow paths from electrolysis cell 162 for routing unused catholyte or anolyte water from housing 150 to recovery tank 108 or a separate waste water tank. A flow path can also be provided for routing unused catholyte or anolyte to a buffer or reservoir (not shown in FIGS. 8A-8C) for later use by cleaner 100. For example if cleaner 100 is configured to enable operation in a cleaning only mode, the anolyte water produced by electrolysis cell 162 may not be needed and can be routed to recovery tank 108 or to a buffer or separate storage tank for later use, such as in a disinfecting operating mode.

If cleaner 100 is configured to enable operation in a disinfecting only mode, the catholyte water produced by electrolysis cell 162 may not be needed and can be routed to recovery tank 108 or to a buffer or separate storage tank for later use, such as in a cleaning operating mode. In a cleaning and disinfecting operating mode, both the catholyte water and the anolyte water are routed along flow path 160 (and through generator 166 and heating element 167) to be applied to the floor either simultaneously or sequentially. The catholyte water can be applied to the floor surface to clean the floor surface and then be removed prior to application of the anolyte water to the same floor surface for disinfecting purposes. The catholyte and anolyte water can also be applied in a reverse order. Alternatively, for example, cleaner 100 can be configured to apply intermittently catholyte water for a short period of time followed by application of anolyte water, or vice versa. The various operating modes that control whether catholyte and/or anolyte water are applied and at what times, concentrations, flow rates and can be controlled by the operator through control unit 146.

In a further embodiment, cleaner 100 can be modified to include two separate cleaning heads, one for dispensing and recovering anolyte water and one for dispensing and recovering catholyte water. For example, each head would include its own liquid dispenser, scrub head and squeegee. One can follow the other along the travel path of the cleaner. For example, the leading head can be used for cleaning, while the trailing head can be used for sanitizing.

As mentioned above, it has been found that when the two liquids streams containing the thermally-enhanced anolyte water and the thermally-enhanced catholyte water are applied to the surface being cleaned at the same time, either through a combined output stream or separate output streams, the two liquids, although blended or combined on the surface, retain their individual enhanced cleaning and sanitizing properties during a typical resident time on the surface. For example, as cleaner 100 advances at a typical rate across the surface being cleaned, the residence time on the surface between distribution to the surface and then recovery by vacuum squeegee 124 is relatively short, such as about three seconds.

In one example, the catholyte water and the anolyte water maintain their distinct electrochemically activated (and oxidatively enhanced) properties for at least 30 seconds, for example, even though the two liquids are blended together. During this time, the distinct electrochemically activated properties of the two types of liquids do not neutralize until after the liquid has been recovered from the surface. This allows the advantageous properties of each liquid to be utilized during a common cleaning operation. After recovery, the nanobubbles begin to diminish and the alkaline and acidic liquids begin to neutralize. Once neutralized, the electrochemical properties, including the pH, of the recovered, blended liquid reverts to those of regular tap water.

Electrolysis cell 162, generator 166, and heating element 167 can each be powered by batteries 142 or by one or more separate power supplies that are powered by or independent of batteries 142 and adapted to provide the electrodes with the desired voltage and current levels in a desired waveform. The liquid distribution path of cleaner 100 can also include, if desired, one or more filters for removing selected components or chemicals from the feed water or the produced EA water to reduce residue left on the surface being cleaned.

In some embodiments, cleaner 100 (or any of the other embodiments disclosed herein) is configured to operate under a power management system that regulates and manages the power applied to heating element 167 (and/or the other elements within the cleaning fluid flow path), such as to preserve or extend the charge state of the battery in cleaner 100. For example, if a user intends to operate cleaner 100 for a two-hour period, the power management system may reduce the electrical power applied to heating element 167 from a default amount. While this may reduce the temperature (and, therefore, the cleaning properties) of the resulting stream compared to the default amount, it will ensure cleaner 100 retains enough electrical power to operate for the two-hour period.

In comparison, if the user alternatively intends to operate cleaner 100 for a thirty-minute period, the power management system may increase the electrical power applied to heating element 167. This accordingly increases the temperature (and cleaning properties) of the resulting stream.

In one embodiment, the power management system is operable via one or more user-activated controls (e.g., at control unit 146). For example, control unit 146 may include a control mechanism (e.g., a dial, button(s) or keypad) that allows a user to select how long the cleaner 100 will be operated. The power management system received the input provided by the user and then regulates the electrical power applied to heating element 167 based on the selected operation time.

The power management system may regulate and manage the electrical power based on one or more different power profiles. In embodiments in which heating element 167 is an electrical heater, the temperature versus electrical power input is substantially linear. As such, under a first embodied power profile, the power management system only includes a maximum limit to the electrical power applied to heating element 167 for safety purposes. If the user selects an operating time duration that is forecasted to drain the battery of cleaner 100 before the operating time duration ends, the power management system may operate heating element 167 at a reduced electrical power level, at decreasing electrical power over time, and/or may disable heating element 167.

Under a second embodied power profile, the power management system includes a maximum limit (for safety purposes) and a minimum limit to the electrical power applied to heating element 167. The minimum electrical power limit is the lower amount of electrical power such that the resulting stream from cleaner 100 retains a minimum cleaning capability, such as a predicted maximum adenosine triphosphate (ATP) count under an ATP test. In this embodiment, the control mechanism may limit the selectable operating time up to a duration that allows heating element 176 to operate at its minimum electrical power limit. This ensures that cleaner 100 has enough electrical power to maintain minimum desired cleaning properties at all times.

In another embodiment, cleaner 100 (or any other embodiment disclosed herein) has a plurality of predetermined, selectable operating time durations, which may be selected by the user by a user input. In response to the user input, the power management system applies a corresponding predetermined voltage (and/or current) to heating element 167.

Figure 9:
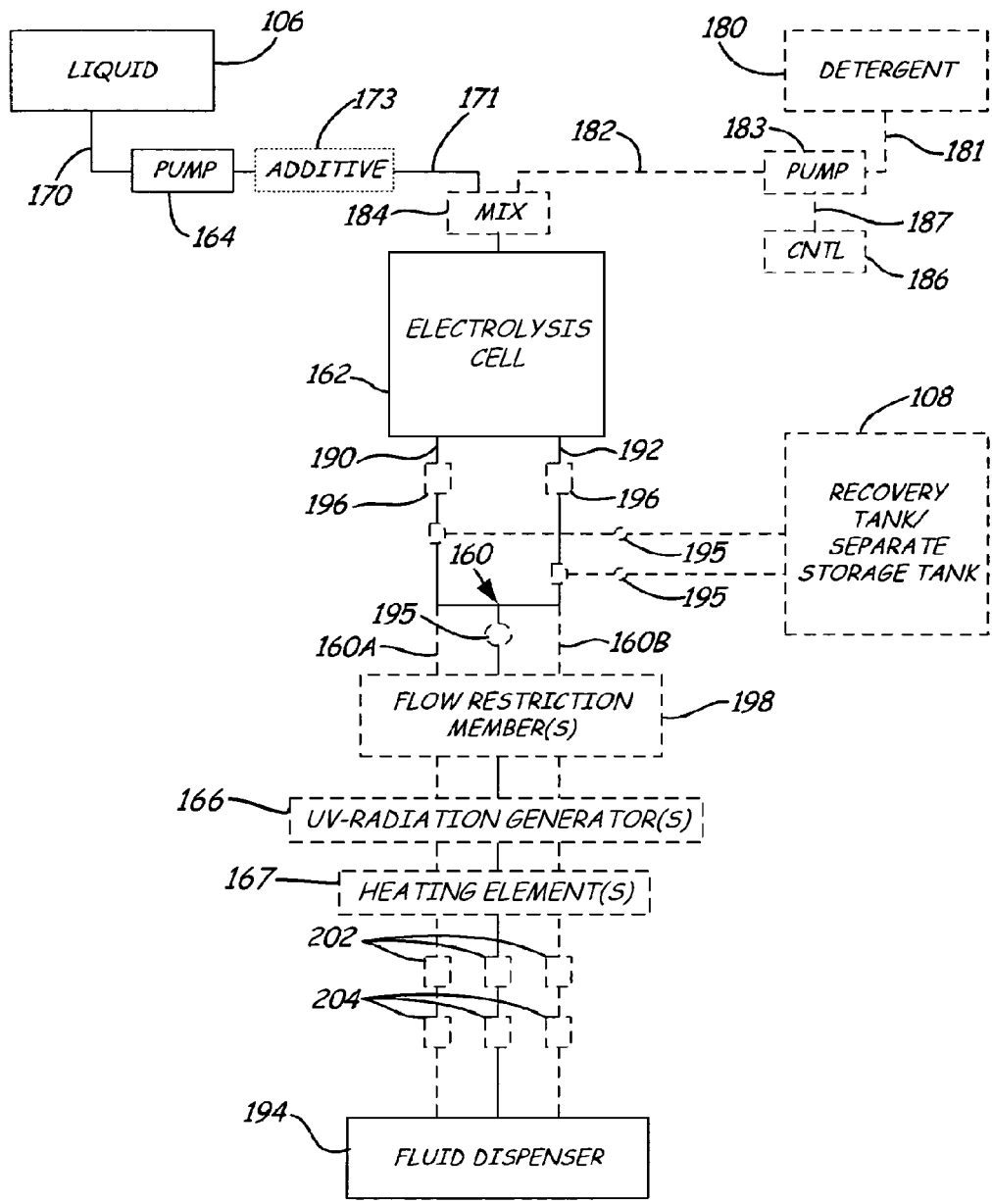
FIG. 9 is a block diagram illustrating a liquid distribution flow path of the cleaner shown in FIGS. 8A-8C in greater detail according to an embodiment of the disclosure.

FIG. 9 is a block diagram illustrating the liquid distribution flow path 160 of cleaner 100 in greater detail according to an embodiment of the disclosure. For simplicity, the wastewater flow path to recovery tank 108 and other components of cleaner 100 are not illustrated in FIG. 9. The elements in flow path 160 can be rearranged upstream or downstream relative to one another in other embodiments. Also, the particular elements along flow path 160 may vary from one embodiment to the next, depending upon the particular application and platform being implemented. Furthermore, one or more of the elements in the block diagram may be omitted, such as recovery tank 108.

The liquid or feed water in tank 106 is coupled to the input of electrolysis cell 162 through conduit sections 170 and 171, and pump 164. Pump 164 can include any suitable type of pump, such as a diaphragm pump.

As discussed above, an additive or boosting compound, such as an electrolyte (e.g., sodium chloride) or other compound, can be added to the feed water at any desired concentration and at any desired location along the flow path upstream of electrolysis cell 162. For example, the additive can be added to the water within tank 106. In a further example, an additive flow-through device 173 can be coupled in-line with the flow path, such as downstream (or upstream) of pump 164 for inserting the additive into the feed water. However, such an additive is not required for many cleaning applications and types of liquid, such as regular tap water. In some applications an additive can be used to further boost the respective pH values of the anolyte and catholyte outputs of electrolysis cell 162 even further away from a neutral pH, if desired.

In applications in which an additional detergent is desired, cleaner 100 can be modified to further include a source 180 of a cleaning agent, which is supplied to the input of electrolysis cell 162 through conduit sections 181 and 182, and pump 183 (all shown in dashed lines). Alternatively, for example, pump 183 can supply the cleaning agent to one or more of the flow paths 160 downstream of electrolysis cell 162 or to the flow path upstream of pump 164, for example. Mixing member 184 mixes the supplied cleaning agent with the feed water from liquid source 106.

The flow of cleaning agent is generated substantially independently of the volume of cleaning agent in supply 180. A check valve (not shown) can be installed in line with conduit section 170 to prevent the back flow of cleaning agent and primary cleaning liquid component to tank 106 when fluid mixing member 184 is upstream of pump 164. Pump 183 can include any suitable pump, such as a solenoid pump.

Controller 186 (shown in dashed lines) controls the operations of pump 183 through a control signal 187 line. In accordance with one embodiment, signal line 187 may carry a pulsed signal that provides power relative to ground (not shown) and controls the duration over which the pump drives the cleaning agent through conduit 182. For example, control signal 187 can turn pump 183 on for 0.1 seconds and off for 2.75 seconds to produce a low volume output flow of concentrated cleaning agent. Other on/off times can also be used. In addition, pumps 164 and 183 can be eliminated and the liquid and cleaning agent can be fed by another mechanism, such as gravity. In the example shown in FIGS. 8A-8C, cleaner 100 does not include elements 180, 183, 184 and 186 since no additional cleaning agent is used.

Electrolysis cell 162 has a catholyte water output or outlet line 190 and an anolyte water output or outlet line 192, which are combined into a common flow path 160 (shown in solid lines) and fed to a fluid dispenser 194 (corresponding to dispenser 20). In another embodiment of the disclosure, flow path 160 includes a separate flow path 160A and 160B (shown in dashed lines) for each output line 190 and 192. The relative flows through the individual or combined flow paths can be controlled through one or more valves or other flow control devices 195 placed along the paths.

Buffers or reservoirs 196 can be placed along paths 160, 160A and/or 160B to collect any catholyte or anolyte produced by electrolysis cell 162 but not immediately delivered to fluid dispenser 194. For example, reservoirs 196 can include a burp valve, which allows the reservoir to fill, then once filled, empty into the respective flow path for use. Other types of reservoirs and valve or baffle systems can also be used. The two reservoirs 196 can be controlled to open or empty alternately, simultaneously, or on any other interval or control signal. If one of the catholyte or anolyte is not being used for a particular cleaning or sanitizing operation, the excess unused liquid can be supplied to recovery tank 108, through valves 195. Alternatively, for example, the liquid can be supplied to a separate storage tank for later use. A separate storage tank can also be used, for example, in embodiments in which the output flow rate of the dispenser exceeds the rate at which one or more of the elements in the flow path can treat the liquid to be dispensed effectively.

In accordance with another embodiment of the disclosure, one or more flow restriction members 198 can be placed in line with flow paths 160, 160A and/or 160B to regulate the flow of liquid if desired or needed for a particular configuration. For example, a pressure drop across flow restriction members 198 can restrict the flow of fluid to provide the desired volume flow rate. For example, a flow restriction member 198 can include a metering orifice or orifice plate that provides a desired output flow, such as of 0.2 GPM when the pressure of outlet of pump 164 is at approximately 40 psi. Other flow rates greater than or less than 0.2 GPM can also be used, for example 0.1 GPM to 1.0 GPM.

If a supply of cleaning agent is used, the volume flow rate of cleaning agent can be limited by pump 183 to approximately 10 cubic centimeters or less per minute, for example. Examples of elements and methods for controlling the volume flow rates of the liquid and the cleaning agent are described in more detail in U.S. Pat. No. 7,051,399. However, these elements and methods are not required in one or more embodiments of the present disclosure.

Cleaner 100 can further include one or more generators 166 and one or more heating elements 167 along combined flow path 160 or along one or both the separate flow paths 160A and 160B, downstream of electrolysis cell 162. Generators(s) 166 and heating element(s) 167 can be located anywhere along flow paths 160, 160A and 160B between electrolysis cell 162 and fluid dispenser 194. As discussed above, cleaner 100 may alternative (or additionally) include one or more heating elements (not shown) located upstream from electrolysis cell 162. Furthermore, generator(s) 166 may alternatively be located downstream from heating element(s) 167, between heating element(s) 167 and fluid dispenser 194.

Flow paths 160, 160A and/or 160B can further include pressure relief valves 202 and check valves 204, which can be located at any suitable position along any flow path in cleaner 100. Check valves 204 can help to limit leakage of liquid when cleaner 100 is not in use. Cleaner 100 may also include one or more sparging devices (not shown) located upstream and/or downstream from electrolysis cell 162, generator(s) 166, and/or heating element(s) 167. Examples of suitable sparging devices for use in cleaner 100 (and cleaning systems 10a-10g) include those disclosed in Field et al., U.S. Patent Application Publication No. 2007/0186368.

Fluid dispenser 194 can include any suitable distribution elements for the particular application in which cleaner 100 is used. For example in one embodiment, fluid dispenser 194 directs the liquid to the hard floor surface or to another component of cleaner 100, such as a scrub head. In the case in which the scrub head has multiple brushes, fluid dispenser 194 can include a T-coupling, for example, can be used to route separate output streams to each brush, if desired. The liquid can be dispensed in any suitable manner, such as by spraying or dripping.

In embodiments in which the anolyte and catholyte are applied separately from one another, fluid dispenser 194 can have separate outputs, one for each type of liquid. Alternatively, for example, fluid dispenser can have a single output, where the flow from each flow path is controlled by a valve, switch or baffle, for example. In a further embodiment, fluid dispenser 194 includes a flow control device that selectively passes the anolyte only, the catholyte only or a mixture of the anolyte and catholyte. The terms fluid dispenser and liquid dispenser can include, for example, a single dispensing element or multiple dispensing elements whether or not those elements are connected together.

It has been found that when the two liquids streams containing the anolyte water and the catholyte water are applied to the surface being cleaned at the same time, either through a combined output stream or separate output streams, the two liquids, although blended on the surface, retain their individual enhanced cleaning and sanitizing properties during a typical resident time on the surface. For example, when cleaner 100 advances at a typical rate across the surface being cleaned, the residence time on the surface between distribution to the surface and then recovery by vacuum squeegee 124 (shown in FIG. 8A) is relatively short, such as about 1-5 seconds, or 2-3 seconds. During this time, the distinct electrochemical activation properties of the two types of liquid (including the oxdiative ions) do not neutralize until after the liquid has been recovered from the surface. This allows the advantageous properties of each liquid to be utilized during a common cleaning operation. This is in addition to the increased cleaning attained by the thermal enhancement of the liquids.

After recovery, the nanobubbles begin to diminish and the alkaline and acidic liquids begin to neutralize. Once neutralized, the electrochemical properties, including the pH, of the recovered, blended liquid reverts to those of regular tap water. This allows the oxidation-reduction potential and other beneficial cleaning/sanitizing properties of a blended water to be substantially retained during the residence time before these properties substantially neutralize in the recovery tank of the cleaner or following disposal.

Also, it has been found that the oxidation-reduction potential and other electrochemically activated properties of the blended water (or other electrochemically-activated liquid) neutralize relatively quickly in the recovery tank after recovery. This allows the recovered liquid to be disposed of almost immediately after a cleaning operation has been completed without having to wait or store the recovered liquid in a temporary disposal tank until the liquid neutralizes.

In further alternative embodiments, the cleaning systems of the present disclosure may be provided as hand-held units, such as spray bottles. In these embodiments, cleaning systems 10a-10g may be implemented in hand-held units, such as those disclosed in Field, U.S. Patent Application Publication No. 2009/0314658; and Field, U.S. Patent Application Publication No. 2010/0147701, the disclosures of each of which are incorporated by reference in their entireties. Additional suitable hand-held units include those commercially available under the trade designations "IONATOR HOM" and "IONATOR EXP" from Activeion Cleaning Solutions, LLC, Minneapolis, Minn. For example, the hand-held cleaning unit may include one or more heating elements and/or UV generators located upstream and/or downstream from the electrolysis cell(s), where the heating element(s), UV generators and/or electrolysis cell(s) may be operated in on-demand applications.

Figure 10:
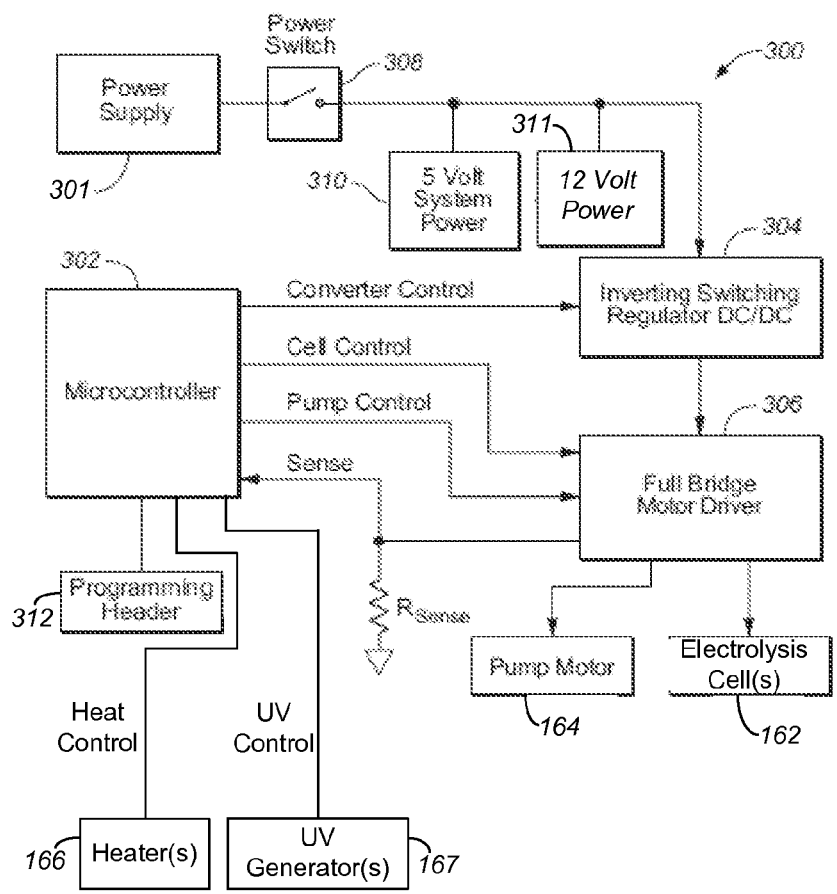
FIG. 10 is a block diagram of an example of a control circuit of the cleaner shown in FIGS. 8A-8C and 9 according to an exemplary aspect of the disclosure.

FIG. 10 is a block diagram of an example of a control circuit 300 for controlling the pump 164 (or 16), electrolysis cell 162 (or 18, 66), UV generator 166 (or 80) and heating element 167 (or 72) of the embodiment shown in FIGS. 8A-8C and 9 according to an exemplary aspect of the disclosure. Power to the various components is supplied by power supply 301. A power switch or other control component 308 provides an output voltage (such as 24 volts) to 5-volt voltage regulator 310, 12-volt voltage regulator 311, DC-to-DC converter 304, and to heating element 167. Any suitable voltage regulators can be used. In a particular example, voltage regulator 310 includes an LM7805 regulator from Fairchild Semiconductor Corporation, which provides a 5 Volt output voltage for powering the various electrical components within the control circuit. Voltage regulator 311 provides a suitable voltage, such as 12 Volts, for powering UV generator(s) 167. This voltage is determined by the power requirements of the particular UV generators being used, and therefore can be different for different embodiments. The output of power switch 308 is also coupled to heating element 166, which may include a self-contained regulator or an external regulator.

DC-to-DC converter 304 generates an output voltage to be applied across the electrodes of electrolysis cell(s) 162. The converter is controlled by microcontroller 302 to step the drive voltage up or down in order to achieve a desired current draw through the electrolysis cell(s). In a particular example, converter 304 steps the voltage up or down between a range of 5 Volts to 60 Volts, such as between 30 Volts and 40 Volts, to achieve a current draw through electrolysis cell(s) 162 of about 1 ampere as pump 164 pumps water through cell(s) 162 and out fluid dispenser 38 (FIG. 9) at a rate of 0.2 gallons per minute, for example. The required voltage depends in part on the conductivity of the water between the cell's electrodes and the geometry of the electrolysis cells. Other voltages, currents and liquid flow rates can be used in other examples.

In a particular example, DC-to-DC converter 304 includes a Series A/SM surface mount converter from PICO Electronics, Inc. of Pelham, N.Y., U.S.A. In another example, converter 1004 includes an NCP3064 1.5 A Step-Up/Down/Inverting Switching regulator from ON Semiconductor of Phoenix, Ariz., U.S.A, connected in a boost application. Other circuits and/or arrangements can be used in alternative embodiments.

Output driver circuit 306 selectively reverses the polarity of the driving voltage applied to electrolysis cell(s) 162 as a function of a control signal generated by microcontroller 302. For example, microcontroller 302 can be configured to alternate polarity in a predetermined pattern, such as every 5 seconds. Output driver 306 can also provide an output voltage to pump 34. Alternatively, for example, pump 34 can receive its output voltage directly from the output of switch 308, for example.

In a particular example, output driver circuit 306 includes a DRV 8800 full bridge motor driver circuit available from Texas Instruments Corporation of Dallas, Tex., U.S.A. Other circuits and/or arrangements can be used in alternative embodiments. The driver circuit 306 has an H-switch inverter that drives the output voltage to electrolysis cell(s) 162 according to the voltage pattern controlled by the microcontroller. The H-switch also has a current sense output that can be used by the microcontroller to sense the current drawn by cell 162. Sense resistor $R_{SENSE}$ develops a voltage that is representative of the sensed current and is applied as a feedback voltage to microcontroller 302. Microcontroller 302 monitors the feedback voltage and controls converter 304 to output a suitable drive voltage to maintain a desired current draw.

Microcontroller 302 also monitors the feedback voltage to verify that electrolysis cell(s) 162 and/or pump 164 is operating properly. Microcontroller 302 can include any suitable controller, processor, and/or circuitry. In a particular embodiment, it includes an MC9S08SH4CTG-ND Microcontroller available from Digi-Key Corporation of Thief River Falls, Minn., U.S.A.

In one example, UV generator 167 is powered by 12-Volt regulator 311 and controlled by microcontroller 302. Heating element 166 is powered directly by the 24-volt power supply 301 through switch 308, for example. In addition, heating element 167 can include an internal or external power regulator, such as a pulse-with modulator, which modulates the current and therefore the electrical power applied to the heating elements under the control of microcontroller 302. In a particular example, UV generator 167 and heating element 166 are enabled (energized) and disabled (de-energized) when pump 164 is enabled and disabled, respectively. In a further example, heating element 166 is enabled and disabled by user control separately from UV generator 167 and cell 162, such as when the user wishes to perform a heaving cleaning operation. Heating element 166 can be disabled at other times to reduce power consumption, if desired.

In the example shown in FIG. 10, the control functions of control circuit 300 are implemented by a microcontroller 302 having a control header 312, which provides an input for programming microcontroller 302. In another embodiment, control circuit 300 includes a processor, which is configured to perform the above-described control functions by software instructions stored on a non-transitory computer-readable medium. Control circuit 312 can also be implemented exclusively in hardware, for example.

In one particular example, the elements 302, 304, 306, 308, 310, 311 reside on circuit board.

Figure 11A:
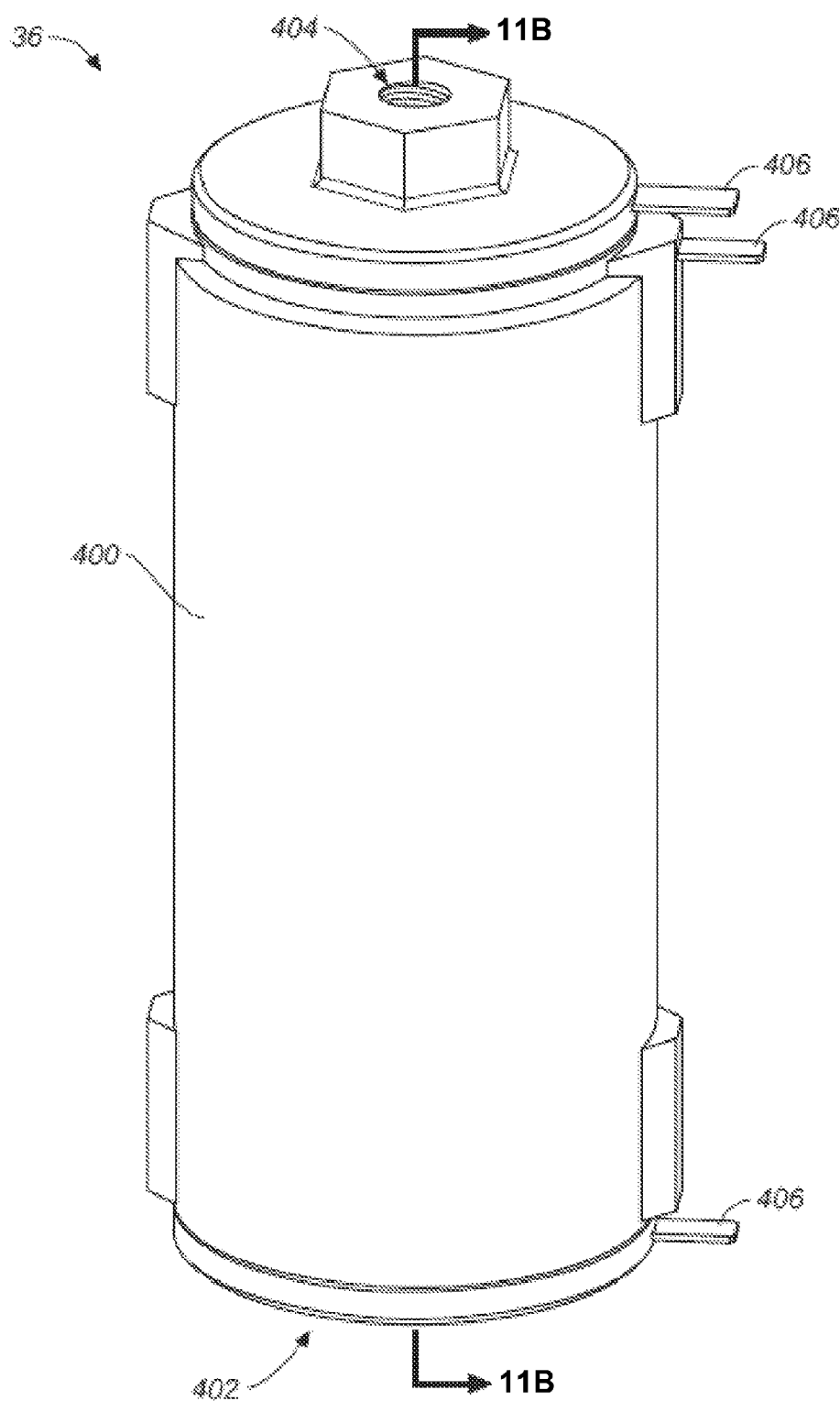
FIG. 11A is a perspective view of an electrolysis cell according to an exemplary aspect of the disclosure.

FIG. 11A is a perspective view of an electrolysis cell 162 (or 18, 66) according to an exemplary aspect of the disclosure. In this non-limiting example, electrolysis cell 162 has a cylindrical shape with a housing 400, an inlet 402, and outlet 404, and electrical terminals 406. Fluid from feed lines (170 in FIG. 9) enters inlet 402 and exits outlet 404. Outlet 404 can be coupled to one or more of the outlet feed lines as shown in FIG. 9. In this example, electrolysis cell has three cylindrical electrodes arranged coaxially with one another, each of which is electrically coupled to a respective terminal 406. Depending on the relative polarity of voltages applied to the terminals 406, the electrolysis cell may include two anode electrodes surrounding a single cathode electrode or may include two cathode electrodes surrounding a single anode electrode. Many other arrangements and numbers of electrodes are also possible.

Figure 11B:
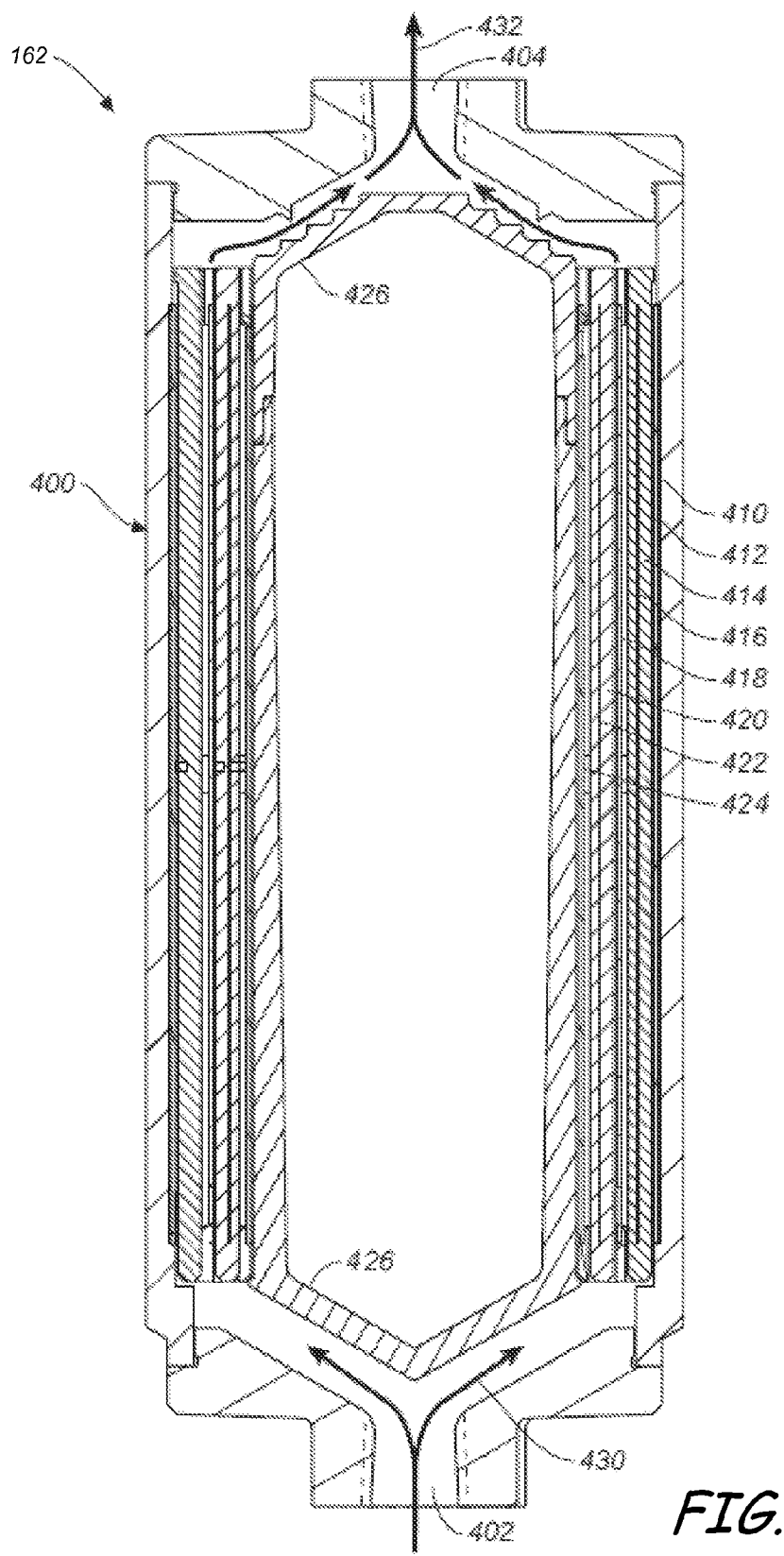
FIG. 11B is a cross-sectional view of the electrolysis cell taken along lines 11B-11B of FIG. 11A.

FIG. 11B is a cross-sectional view of the electrolysis cell 36 taken along lines 11B-11B of FIG. 11A. Within cylindrical housing 400, cell 36 includes a liner (such as polyprolylene) 410, a first, outer electrode 412, a gap 414 containing a first, outer barrier 416, a second, middle electrode 418, a gap 420 containing a second, inner barrier 422, and an inner electrode 424. The first gap 414 is positioned between outer electrode 412 and middle electrode 418, and contains the first barrier 416. The second gap 420 is positioned between middle electrode 418 and inner electrode 424, and contains the second barrier 422.

An inner core 426 blocks liquid from passing through the center of cell 36, and diverts liquid entering inlet 402 along the direction of arrows 430. This liquid enters the gaps 414 and 420 between the electrodes and passes along the electrodes 412, 418, and 424, on either side of the barriers 416 and 422. The liquid then exits outlet 404 along arrows 432. Anolyte liquid produced in the anode chamber, formed between the anode electrode and a respective barrier, and catholyte liquid produced in the cathode chamber, formed between the cathode electrode and a respective barrier, blend together as the liquid exits single outlet 404.

In a particular example, electrodes 412, 418 and 424 are made of a titanium mesh coated with iridium oxide, which are spaced apart from one another by a gap of about 0.030 inches (0.76 mm). The barriers 416 and 422 are constructed of polypropylene sheets having a thickness of 10 mils (0.254 mm).

Figure 12:
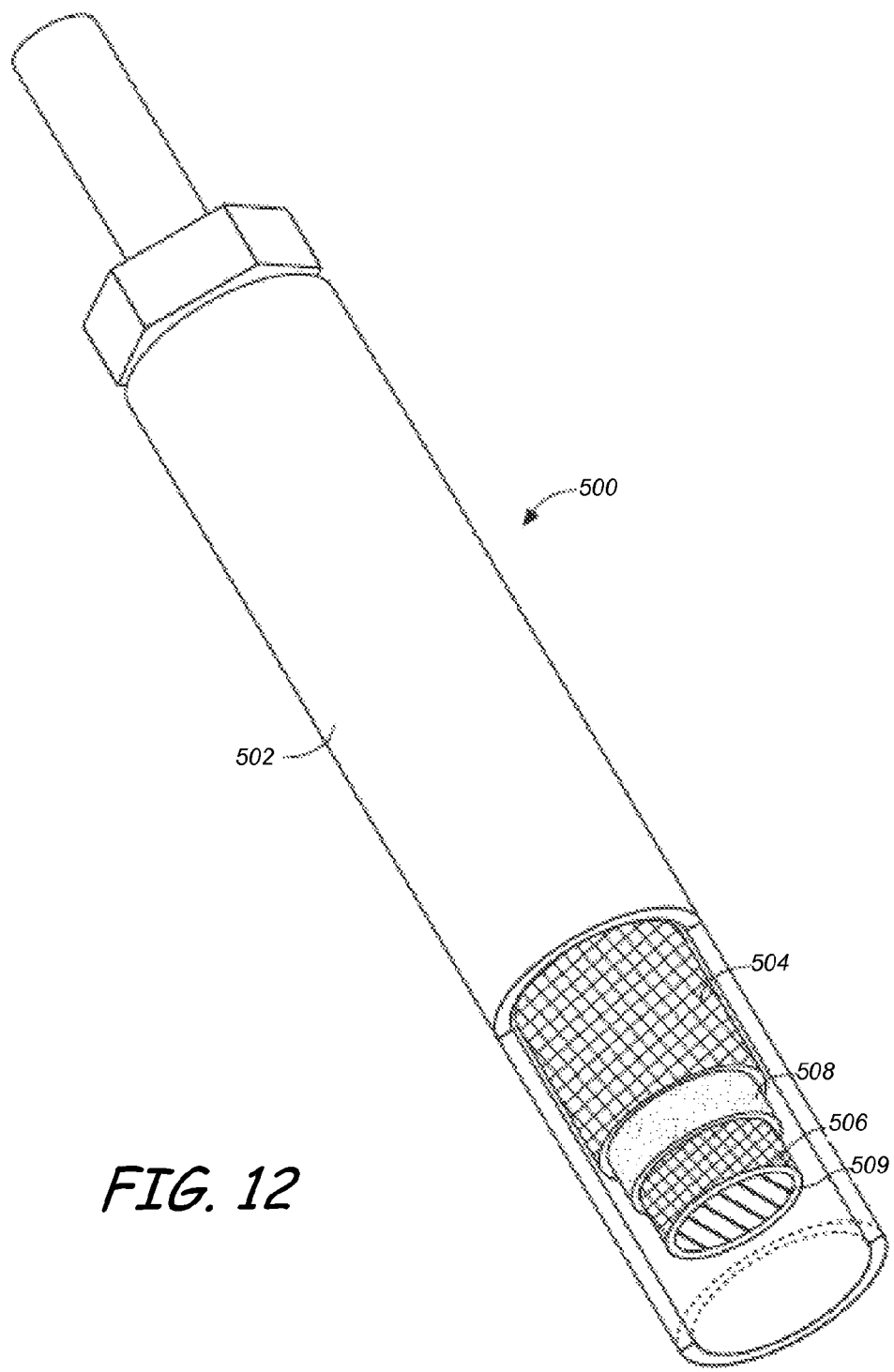
FIG. 12 is a perspective view of an electrolysis cell according to an exemplary aspect of the disclosure having a tubular shape.

FIG. 12 illustrates another example of an electrolysis cell 500 having a tubular shape according to one illustrative example. The radial cross-section of cell 500 can have any shape, such as circular as shown in FIG. 12, or other shapes such as curvilinear shapes having one or more curved edges and/or rectilinear shapes. Specific examples include ovals, polygons, such as rectangles, etc. Portions of cell 500 are cut away for illustration purposes. Portions of cell 200 are cut away for illustration purposes. In this example, cell 500 is an electrolysis cell having a tubular housing 502, a tubular outer electrode 504, and a tubular inner electrode 506, which is separated from the outer electrode by a suitable gap, such as 0.040 inches. Other gap sizes can also be used, such as but not limited to gaps in the range of 0.020 inches to 0.080 inches. Either of the inner or outer electrode can serve as the anode/cathode, depending upon the relative polarities of the applied voltages.

A barrier 508 is positioned between the outer and inner electrodes 504 and 506. Barrier 508 can include any of the barrier materials discussed such as those discussed with respect to FIG. 1. In a particular example, the barrier material includes polypropylene having a thickness of 10 mils (0.254 mm).

The electrodes 504 and 506 can be made from any suitable material, for example a conductive polymer, stainless steel, titanium and/or titanium coated with a precious metal, such as platinum, or any other suitable electrode material, as discussed herein with respect to the other figures. In a specific example, electrodes 504 and 506 are formed of a metallic mesh, with regular-sized rectangular openings in the form of a grid. In one specific example, the mesh is formed of 0.023-inch diameter T316 (or, e.g. 304) stainless steel having a grid pattern of 20×20 grid openings per square inch. However, other dimensions, arrangements and materials can be used in other examples.

In this example, at least a portion of the volume of space within the interior of tubular electrode 506 is blocked by a solid inner core 509 to promote liquid flow along and between electrodes 504 and 506 and barrier 508, in a direction along the longitudinal axis of housing 502. This liquid flow is conductive and completes an electrical circuit between the two electrodes. Electrolysis cell 500 can have any suitable dimensions. In one example, cell 500 can have a length of about 4 inches long and an outer diameter of about ¾ inch. The length and diameter can be selected to control the treatment time and the quantity of bubbles, e.g., nanobubbles and/or microbubbles, generated per unit volume of the liquid.

Cell 500 can include a suitable fitting at one or both ends of the cell. Any method of attachment can be used, such as through plastic quick-connect fittings. In the example shown in FIG. 12, cell 500 produces anolyte EA liquid in the anode chamber (between one of the electrodes 504 or 506 and barrier 508) and catholyte EA liquid in the cathode chamber (between the other of the electrodes 504 or 506 and barrier 208). The anolyte and catholyte EA liquid flow paths join at the outlet of cell 500. As a result, anolyte and catholyte EA liquids are blended. A specific embodiment of electrolysis cell 500 is disclosed in more detail in Field, U.S. Patent Publication No. 2009/0314659, published Dec. 24, 2009, and incorporated herein by reference in its entirety.

Figure 13:
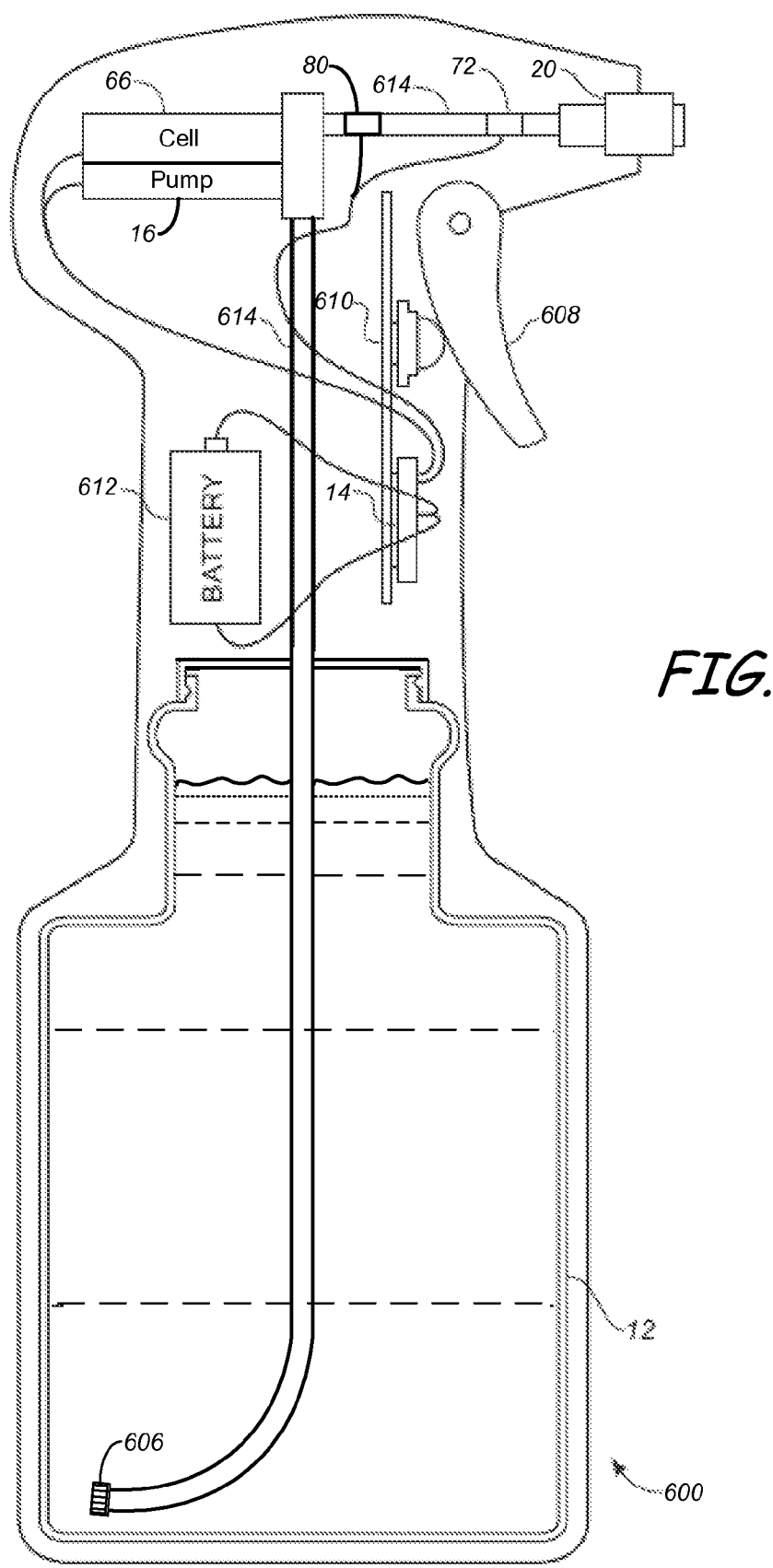
FIG. 13 is a schematic diagram of an example of a hand-held spray device in the form of a hand-held spray bottle according to an exemplary aspect of the present disclosure.

FIG. 13 is a simplified, schematic diagram of an example of a hand-held spray device in the form of a hand-held spray bottle 600 according to an exemplary aspect of the present disclosure in which the system 10g of FIG. 7 is implemented on the spray device. In another example, the spray device may form part of a larger device or system.

With respect to the components of system 10g implemented on bottle 600, these components can correspond to the components described with reference to any of the embodiments discussed herein, for example, in addition to the embodiments discussed with respect to FIG. 7. In the example shown in FIG. 13, spray bottle 600 includes a reservoir forming the liquid source 12 for containing a liquid to be treated and then dispensed through dispenser 20 (such as a spray nozzle). In an example, the liquid to be treated includes an aqueous composition, such as regular tap water.

Spray bottle 600 further includes an inlet filter 606, pump 16, electrolysis cell 66, UV generator 80, heating element 72, an actuator 608, a switch 610, circuit board and control electronics 14 and batteries 612. Batteries 612 can include disposable batteries and/or rechargeable batteries, for example, or other appropriate portable or corded electrical source in addition to or in place of batteries, to provide electrical power to pump 16, electrolysis cell 66, UV generator 80 and heating element 72 when energized by circuit board and control electronics 14.

In the example shown in FIG. 13, actuator 608 is a trigger-style actuator, which actuates momentary switch 610 between open and closed states. For example, when the user squeezes the hand trigger, the trigger actuates the switch from the open state to the closed state. When the user releases the hand trigger, the trigger actuates the switch into the open state. However, actuator 608 can have other styles or structure in alternative embodiments and can be eliminated in further embodiments. In embodiments that lack a separate actuator, switch 610 for example can be actuated directly by a user. When switch 610 is in the open, non-conducting state, control electronics 14 de-energizes pump 16, electrolysis cell 66, UV generator 80 and heating element 72. When switch 610 is in the closed, conducting state, control electronics 14 energizes pump 16, electrolysis cell 66, UV generator 80 and heating element 72. Pump 16 draws liquid from reservoir 12 through filter 606, the various sections of tubing 22, electrolysis cell 66, UV generator 80 and heating element 72 and forces the liquid out nozzle 20. Depending on the sprayer, nozzle 20 may or may not be adjustable, so as to select between squirting a stream, aerosolizing a mist, or dispensing a spray, for example.

Switch 610, itself, can have any suitable actuator type, such as a push-button switch as shown in FIG. 13, a toggle, a rocker, any mechanical linkage, and/or any sensor to sense input, including for example capacitive, resistive plastic, thermal, inductive, mechanical, non-mechanical, electro-mechanical, or other sensor, etc. Switch 610 can have any suitable contact arrangement, such as momentary, single-pole single throw, etc.

In an alternative embodiment, pump 16 is replaced with a mechanical pump, such as a hand-triggered positive displacement pump, wherein actuator trigger 608 acts directly on the pump by mechanical action. In this embodiment, switch 610 could be separately actuated from the pump 16, such as a power switch, to energize the various elements of bottle 600. In a further embodiment, batteries 612 are eliminated and power is delivered via another portable source, e.g., a rotating dynamo, shaker or solar source etc., or delivered to spray bottle 600 from an external source, such as through a power cord, plug, and/or contact terminals.

The arrangement shown in FIG. 13 is provided merely as a non-limiting example. Spray bottle 600 can have any other structural and/or functional arrangement. For example, the spray device may have the form of a wand, which may or may not be connected to a cleaning device, such as a mop bucket, a motorized or non-motorized all-purpose cleaner, a mobile cleaning device with or without a separate cleaning head, a vehicle, etc.

EXAMPLES

The present disclosure is more particularly described in the following examples that are intended as illustrations only, since numerous modifications and variations within the scope of the present disclosure will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

A cleaning system of the present disclosure (Example 1) and a comparative cleaning system (Comparative Example A) were operated to compare their cleaning capabilities on soiled test strips. The soiled test strips included uniform coatings of various soiling compositions that are typical in light industrial settings, retail environments (e.g., as in food courts), food preparation settings, and public dining areas. The same soiling compositions were used for direct comparisons of the cleaning runs between the cleaning system of Example 1 and the cleaning system of Comparative Example A. The cleaning system of Example 1 and the cleaning system of Comparative Example A were also operated side-by-side for direct comparisons of their cleaning capabilities.

The cleaning system of Example 1 included a feed source of tap water, an electrolysis cell, a downstream heating element, and a dispensing sprayer. The electrolysis cell was commercially available under the trade designation "ec-H2O" Electrically Converted Water Technology from Tennant Company, Minneapolis, Minn. During operation, the tap water was pumped through the electrolysis cell, the heating element, and the dispensing sprayer.

The electrolysis cell electrochemically activated the tap water and increased the temperature of the water by several degrees. The alkaline stream of the electrochemically-activated water was then directed through the heating element, which further heated the electrochemically-activated water to about 125° F. during steady-state operation. The resulting heated, alkaline water was then lightly sprayed from the dispensing sprayer onto soiled test strips.

The cleaning system of Comparative Example A included an alkaline water (pH of 10.5), which was maintained at about 75° F. During operation, the alkaline water was fed to a dispensing sprayer, which was the same model as the dispensing sprayer in the cleaning system of Example 1. The resulting water was then lightly sprayed onto soiled test strips at the same rate as that used in the cleaning system of Example 1.

During each cleaning run, the cleaning system of Example 1 removed more of the soiling composition from its soiled test strip compared to the cleaning system of Comparative Example A. Because both cleaning systems sprayed an alkaline water onto their respective soiled test strips, it is believed that the elevated temperature of the sprayed alkaline water from the cleaning system of Example 1 attributed to the increased cleaning capabilities. As such, the combination of the electrochemical activation and the thermal enhancement provided a suitable treatment liquid for cleaning a variety of surfaces.

Although the present disclosure has been described with reference to preferred embodiments, workers skilled in the art will recognize that changes may be made in form and detail without departing from the spirit and scope of the disclosure.

What is claimed is:

1. A method for cleaning a surface, the method comprising:
providing a system having an electrolysis cell, an ultraviolet-radiation generator, a heating element, a dispenser, and a fluid line, wherein the electrolysis cell, the ultraviolet-radiation generator, the heating element, and the dispenser are located along the fluid line such that the heating element is disposed between the ultraviolet-radiation generator and the dispenser;
pumping a feed liquid having a first temperature from a liquid source through the fluid line to the electrolysis cell;
electrochemically activating and heating the feed liquid in the electrolysis cell to provide an electrochemically-activated liquid at an second temperature that is greater than the first temperature, and which comprises reactive oxidative species;
passing the electrochemically-activated liquid from the electrolysis cell and through the ultraviolet-radiation generator;
emitting ultraviolet radiation towards the electrochemically-activated liquid in the ultraviolet-radiation generator to generate an oxidatively-enhanced, electrochemically-activated liquid in which the reactive oxidative species are converted to radicals with increased oxidation potentials compared to the reactive oxidative species in the electrochemically-activated liquid;
heating the oxidatively-enhanced, electrochemically-activated liquid with the heating element;
dispensing the heated, oxidatively-enhanced, electrochemically-activated liquid from the dispenser to the surface; and
cleaning the surface with the dispensed heated, oxidatively-enhanced, electrochemically-activated liquid.

2. The method of claim 1, and further comprising preheating the feed liquid with a second heating element located upstream from the electrolysis cell.

3. The method of claim 1, wherein the surface is a surface in a cold-room environment, and wherein the feed liquid is substantially free of glycol-based compositions.

4. The method of claim 1, wherein the reactive oxidative species comprise hydrogen peroxide and hydrogen hypochlorite, and wherein the converted radicals of the reactive oxidative species comprise hydroxyl radicals.

5. The method of claim 4, wherein the converted radicals of the reactive oxidative species further comprise chlorine radicals.

6. A method for cleaning a surface, the method comprising:
providing a system having an electrolysis cell, an ultraviolet-radiation generator, a heating element, a dispenser, and a fluid line, wherein the electrolysis cell, the ultraviolet-radiation generator, the heating element, and the dispenser are located along the fluid line such that the heating element is disposed between the ultraviolet-radiation generator and the dispenser;
pumping a feed liquid from a liquid source through the fluid line to the electrolysis cell;
inducing a current through the electrolysis cell to electrochemically activate and heat the feed liquid in the electrolysis cell to provide an electrochemically-activated liquid;
passing the electrochemically-activated liquid from the electrolysis cell and through the ultraviolet-radiation generator;

emitting ultraviolet radiation towards the electrochemically-activated liquid in the ultraviolet-radiation generator to generate an oxidatively-enhanced, electrochemically-activated liquid in which the reactive oxidative species are converted to radicals with increased oxidation potentials compared to the reactive oxidative species in the electrochemically-activated liquid;

heating the oxidatively-enhanced, electrochemically-activated liquid with the heating element;

monitoring a temperature of the oxidatively-enhanced, electrochemically-activated liquid in the fluid line;

controlling at least one of the pumping and the inducing of the current in response to the monitored temperature;

dispensing the heated, oxidatively-enhanced, electrochemically-activated liquid from the dispenser to the surface; and cleaning the surface with the dispensed heated, oxidatively-enhanced, electrochemically-activated liquid.

7. The method of claim 6, and further comprising preheating the feed liquid with a second heating element located upstream from the electrolysis cell.

8. The method of claim 6, wherein controlling at least one of the pumping and the inducing of the current in response to the monitored temperature maintains the temperature of the heated, oxidatively-enhanced, electrochemically-activated liquid directed through the fluid line within a predetermined temperature range.

9. The method of claim 6, wherein the reactive oxidative species comprise hydrogen peroxide and hydrogen hypochlorite, and wherein the converted radicals of the reactive oxidative species comprise hydroxyl radicals.

10. The method of claim 9, wherein the converted radicals of the reactive oxidative species further comprise chlorine radicals.

11. The method of claim 6, wherein the surface is a surface in a cold-room environment, and wherein the feed liquid is substantially free of glycol-based compositions.

* * * * *